United States Patent
Davis et al.

(10) Patent No.: US 8,121,629 B2
(45) Date of Patent: Feb. 21, 2012

(54) RADIO DEVICE

(75) Inventors: Peter Davis, Kyoto (JP); Satoko Itaya, Kyoto (JP); Jun Hasegawa, Kyoto (JP); Akio Hasegawa, Kyoto (JP); Naoto Kadowaki, Kyoto (JP); Sadao Obana, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 955 days.

(21) Appl. No.: 11/887,188

(22) PCT Filed: Mar. 29, 2006

(86) PCT No.: PCT/JP2006/306419
§ 371 (c)(1),
(2), (4) Date: Sep. 26, 2007

(87) PCT Pub. No.: WO2006/104185
PCT Pub. Date: Oct. 5, 2006

(65) Prior Publication Data
US 2008/0125069 A1    May 29, 2008

(51) Int. Cl.
*H04B 7/00* (2006.01)
(52) U.S. Cl. .................... 455/519; 455/226.1; 455/226.2
(58) Field of Classification Search ................. 455/445, 455/519, 518, 520, 522
See application file for complete search history.

(56) References Cited

U.S. PATENT DOCUMENTS

| 2004/0121792 A1* | 6/2004 | Allen et al. ................. 455/519 |
| 2005/0197127 A1 | 9/2005 | Nakasaku et al. |
| 2006/0205424 A1* | 9/2006 | Dupcinov et al. ............ 455/513 |

FOREIGN PATENT DOCUMENTS

| JP | 2003-115858 | 4/2003 |
| JP | 2005-236632 | 9/2005 |
| JP | 2005-252781 | 9/2005 |
| JP | 2005-323266 | 11/2005 |
| JP | 2006-505186 | 2/2006 |
| JP | 2006-81163 | 3/2006 |
| JP | 2006-086782 | 3/2006 |

(Continued)

OTHER PUBLICATIONS

Watanabe, M., "Wireless Ad hoc Network", Society of Automotive Engineers of Japan, Annual Spring Congresses in Yokohama, Humantronics Forum, May 2003, pages 18-23.

(Continued)

*Primary Examiner* — Lana N Le
*Assistant Examiner* — Golam Sorowar
(74) *Attorney, Agent, or Firm* — McDermott Will & Emery LLP

(57) ABSTRACT

Radio devices (31 to 43) receive a prescribed number of Hello packets from each of n radio devices existing within one hop from each radio device, detects six pairs of maximum and minimum values MAX[1] and MIN[1] to MAX[6] and MIN[6] based on the plurality of reception signal strengths of the plurality of received Hello packets, detects two adjacent maximum values having the largest difference among six pairs of maximum and minimum values D_MAX[1] and D_MIN[1] to D_MAX[6] and D_MIN[6] when the six maximum values MAX[1] to MAX[6] are in descending order, and determines the average of two minimum values corresponding to the detected two maximum values as a threshold. The radio devices (31 to 43) each produce a routing table including routes having reception signal strengths equal to or more than the threshold.

15 Claims, 28 Drawing Sheets

FOREIGN PATENT DOCUMENTS

WO    WO 2004/040863 A1    5/2004

OTHER PUBLICATIONS

Pei, G., et al., "Fisheye State Routing: A Routing Scheme for Ad Hoc Wireless Networks", ICC2000, Commun., June 2000, pp. 70-74, vol. 1, L.A.

Dube, R., et al., "Signal Stability-Based Adaptive Routing (SSA) for Ad Hoc Mobile Networks," Feb. 1997, IEEE Personal Communications.

Satoko Itaya, et al., "Proposal and experiment of stabilization methods on large ad hoc wireless networks," IPSJ SIG Technical Reports, IPSJ, Nov. 17-18, 2005, vol. 2005, No. 113, pp. 17-22.

Hasegawa, Jun, et al., "Performance evaluation of ad-hoc routing in an office environment," IPSJ SIG Technical Reports, IPSJ, May 13-14, 2004, vol. 2004, No. 44, pp. 71-74.

Oba, Makoto, et al., "A Link Quality-based Routing Protocol for Wireless Ad Hoc Networks," IEICE Technical Report, The Institute of Electronics, Information and Communication Engineers, Apr. 14, 2005, vol. 105, No. 16, pp. 7-12.

Japanese Notification of Reasons for Refusal, w/ English translation thereof, issued in Japanese Patent Application No. JP 2006-262579 dated on Sep. 30, 2008.

United States Office Action issued in U.S. Appl. No. 11/905,006, dated May 5, 2010.

U.S. Appl. No. 11/905,006, filed on Sep. 27, 2007.

* cited by examiner

Fig. 3

| BIT 0 | BIT 8 | BIT 16 | BIT 24 | BIT 31 |
|---|---|---|---|---|
| Version (Version) | IHL (Header Length) | Type of Service (Type of Service) | Total Length (Packet Length) | |
| Identification (Identification Number) | | | Flags (Flags) | Fragment Offset (Fragment Offset) |
| Time to Live (Time to Live) | Protocol (Protocol) | | Header Checksum (Header Checksum) | |
| Source Address (Source Address) | | | | |
| Destination Address (Destination Address) | | | | |
| Options (Options) | | | | |

Fig. 4

| Source Port (Source Port Number) | | | Destination Port (Destination Port Number) |
|---|---|---|---|
| Sequence Number (Sequence Number) ||||
| Acknowledgement Number (Acknowledgement Number) ||||
| Data Offset (Data Offset) | Reserved (Reserved) | Code Bit (Flags) | Window (Window Size) |
| Header Checksum (Header Checksum) | | | Urgent Pointer (Urgent Pointer) |

BIT 0 — BIT 8 — BIT 16 — BIT 24 — BIT 31

| DESTINATION | NEXT RADIO DEVICE | HOP NUMBER |
|---|---|---|
| ..... | ..... | ..... |
| ..... | ..... | ..... |
| ⋮ | ⋮ | ⋮ |

Fig. 12A

NEIGHBOR LIST OF RADIO DEVICE 32   10B

| index | ADJACENT RADIO DEVICES |
|---|---|
| 1 | 31 |
| 2 | 35 |
| 3 | 36 |

Fig. 12B

NEIGHBOR LIST OF RADIO DEVICE 35   10C

| index | ADJACENT RADIO DEVICES |
|---|---|
| 1 | 32 |
| 2 | 33 |
| 3 | 38 |
| 4 | 36 |

Fig. 12C

NEIGHBOR LIST OF RADIO DEVICE 38   10D

| index | ADJACENT RADIO DEVICES |
|---|---|
| 1 | 35 |
| 2 | 34 |
| 3 | 40 |
| 4 | 39 |
| 5 | 36 |

Fig. 12D

NEIGHBOR LIST OF RADIO DEVICE 37   10E

| index | ADJACENT RADIO DEVICES |
|---|---|
| 1 | 31 |
| 2 | 36 |
| 3 | 41 |

Fig. 13A

NEIGHBOR LIST OF RADIO DEVICE 39          10F

| index | ADJACENT RADIO DEVICES |
|---|---|
| 1 | 36 |
| 2 | 38 |
| 3 | 40 |
| 4 | 42 |
| 5 | 41 |

Fig. 13B

NEIGHBOR LIST OF RADIO DEVICE 41          10G

| index | ADJACENT RADIO DEVICES |
|---|---|
| 1 | 37 |
| 2 | 36 |
| 3 | 39 |
| 4 | 42 |
| 5 | 43 |

| DESTINATION | NEXT RADIO DEVICES | HOP NUMBER |
|---|---|---|
| 40 | 39 | 2 |
| 42 | 39 | 2 |
| 43 | 41 | 2 |

RADIO DEVICE

RELATED APPLICATIONS

This application is the U.S. National Phase under 35 U.S.C. §371 of International Application No. PCT/JP2006/306419, filed on Mar. 29, 2006, which in turn claims the benefit of Japanese Application No. 2005-100356, filed on Mar. 31, 2005, the disclosures of which Applications are incorporated by reference herein.

TECHNICAL FIELD

The present invention relates to a radio device, and more particularly to a radio device in an ad hoc network that is formed autonomously and instantaneously using a plurality of radio devices.

BACKGROUND ART

The ad hoc network is constructed autonomously and instantaneously by mutual communication between a plurality of radio devices. In the ad hoc network, if two communicating radio devices are not present in each other's communication areas, a radio device positioned between the two radio devices functions as a router to relay data packets, and therefore a wide range multi-hop network can be formed.

The ad hoc network has come to find various applications for example in radio communication networks in disaster stricken areas or streaming between vehicles in ITS (Intelligent Transport Systems) (Non-Patent Document 1).

Dynamic routing protocols that support multi-hop communication include table-driven protocols and on-demand protocols. The table-driven protocols allow control information related to routes to be regularly exchanged, so that a routing table is previously set, and known examples of the protocols include FSR (Fish-eye State Routing), OLSR (Optimized Link State Routing), and TBRPF (Topology Dissemination Based on Reverse-Path Forwarding).

The on-demand protocols allow a route to a destination to be made only when a demand for data transmission is issued, and known examples of the protocols include DSR (Dynamic Source Routing) and AODV (Ad Hoc On-Demand Distance Vector Routing).

In a conventional ad hoc network, when data communication is carried out from a source to a destination, the communication route is determined so that the number of hops between the source and the destination can be as small as possible (Non-Patent Document 2).

However, a radio wave environment is unstable and therefore a route with less hops does not necessarily constitute a good quality route. Therefore, it would be better to select only a stable route by any method, and one such known typical method is to introduce a signal strength threshold and another known method is to measure a packet loss rate.

The method by measuring the packet loss rate is effectively applied when there are a number of continuous packet losses.

As the method of determining the signal strength threshold, a method of extracting a stable route using the average of signal strengths has been known (Non-Patent Document 3).

Non-Patent Document 1: Masahiro Watanabe, "Wireless Ad hoc Network," Society of Automotive Engineers of Japan, Annual Spring Congresses in Yokohama, Humantronics Forum, pp. 18-23, May 2003.

Non-Patent Document 2: Guangyu Pei, et al., "Fisheye State Routing: A Routing Scheme for Ad Hoc Wireless Networks," ICC2000. Commun., Volume 1, L.A., pp. 70-74, June 2000.

Non-Patent Document 3: Rohit Dube, Cynthia D. Rais, Kuang-Yeh Wang, and Satish K. Tripathi, "Signal Stability-Based Adaptive Routing (SSA) for Ad Hoc Mobile Networks," IEEE Personal Communications, pp. 36-45, February 1997.

DISCLOSURE OF THE INVENTION

In the method of using the packet loss rate, however, it is possible that there is almost no packet loss but the radio wave strength is very low in a certain location, and the communication state around the location could be unstable. In other cases, the manner of how packets are lost in a radio wave environment bordering the possible communication limit is complex and cannot be estimated.

FIGS. 32A and 32B are first and second graphs showing the relation between a packet arrival interval and a number of received packets, respectively. FIG. 32A shows the state in which the link between radio devices is stable and FIG. 32B shows the state in which the link between radio devices is unstable.

In FIGS. 32A and 32B, the ordinate represents the packet arrival interval and the abscissa represents the number of received packets. If the link between radio devices is stable, almost all the packets arrive at fixed intervals (see FIG. 32A). If the link between the radio devices is unstable, the packet arrival interval changes in a complex manner (see FIG. 32B). Therefore, in a radio wave environment in which the link between the radio devices is unstable, it is difficult to estimate the manner of how packets are lost.

As for the method of determining an average as a threshold, an actual signal strength does not depend only on the distance but greatly fluctuates even when the radio devices are fixed. FIG. 33 is a timing chart showing the reception signal strength. In FIG. 33, the ordinate represents the reception signal strength, and the abscissa represents time. A fluctuation width of "0.05" in the reception signal strength shown in FIG. 33 corresponds to a fluctuation width of 10 dBm. As shown in FIG. 33, the reception signal strength greatly fluctuates with time, and the fluctuation width is about 35 dBm in maximum. In this way, the reception signal strength greatly fluctuates even if the radio devices are fixed.

Therefore, if the signal strength threshold is set too high, the reception signal strength in the radio devices having the stable link transverses the threshold a number of times in practice, which causes the routing table to be frequently rewritten, so that mismatching between the routing table and the network can occur more easily in the network. Consequently, a loop could be generated in the network, and the sequence of packet arrival can greatly be changed, or more packets may be lost.

Therefore, the invention is directed to a solution to these problems, and it is an object of the invention to provide a radio device that allows stable routing to be performed.

A radio device according to the invention is for use in an autonomously established radio network by which radio communication is carried out between a source and a destination and includes threshold determining means and table producing means. The threshold determining means determines a threshold used to detect a radio characteristic equal to or more than the minimum radio characteristic of radio waves transmitted and received in a stable radio wave environment, based on a plurality of radio waves received from n (n is a positive integer) radio devices. The table producing means produces a routing table that shows routing information between the source and the destination based on the routing information of routes having a radio wave characteristic equal to or more than the determined threshold.

The threshold determining means preferably determines a threshold used to detect a strength equal to or more than the minimum strength of radio waves transmitted and received in the stable radio wave environment. The table producing means preferably produces the routing table based on the routing information of routes having a strength equal to or more than the determined threshold.

The threshold determining means preferably includes signal strength detecting means, rearranging means, and setting means. The signal strength detecting means carries out signal strength detection processing to detect the first set of m (m is an integer equal to or more than a prescribed number) pairs of signal strengths including m maximum reception signal strengths and m minimum reception signal strengths corresponding to the m maximum reception signal strengths, based on the plurality of received radio waves. The rearranging means rearranges the detected first set of m pairs of signal strengths so that the m maximum reception signal strengths are in descending or ascending order and produces a second set of m pairs of signal strengths. The setting means detects first and second minimum reception signal strengths corresponding to two adjacent first and second maximum reception signal strengths having the largest difference among the m maximum reception signal strengths in the second set of m pairs of signal strengths and sets the threshold in the range defined as having the detected first and second minimum reception signal strengths as end values.

Preferably, n equals m. The signal strength detecting means sequentially receives a plurality of radio waves from each radio device and carries out signal strength detection processing to detect one pair of maximum and minimum reception signal strengths from the received plurality of radio waves for each of the n radio devices, thereby detecting the first set of m pairs of signal strengths.

Preferably, n is an integer smaller than the prescribed number. The signal strength detecting means detects the first set of m pairs of signal strengths based on a plurality of radio waves transmitted from the n radio devices while the radio wave strength in transmission and reception is changed.

Preferably, if packet error is at least a prescribed value, the signal strength detecting means carries out the signal strength detection processing again to detect a new first set of m pairs of signal strengths, the rearranging means carries out the rearranging processing based on the new first set of m pairs of signal strengths to produce new second set of m pairs of signal strengths, and the setting means detects a new pair of first and second minimum reception signal strengths based on the new second set of m pairs of signal strengths and updates the threshold by setting the threshold in the range defined as having the detected new pair of first and second minimum reception signals as end values.

The prescribed number preferably represents the number of radio devices for which the threshold can stably be determined. If the number n of the radio devices increases to the prescribed number or more, the signal strength detecting means carries out the signal strength detection processing again to detect a new first set of m pairs of signal strengths, the rearranging means carries out the rearranging processing based on the new first set of m pairs of signal strengths to produce a new second set of m pairs of signal strengths, and the setting means detects a new pair of first and second minimum reception signal strengths based on the new second set of m pairs of signal strengths and updates the threshold by setting the threshold in the range defined as having the detected new pair of first and second minimum reception signals as end values.

Preferably, if a prescribed number of radio devices are added to the n radio devices, the signal strength detecting means carries out the signal strength detection processing again based on a plurality of radio waves received from the prescribed number of radio devices and the n radio devices to detect a new first set of m pairs of signal strengths, the rearranging means carries out the rearranging processing based on the new first set of m pairs of signal strengths to produce a new second set of m pairs of signal strengths, and the setting means detects a new pair of first and second minimum reception signal strengths based on the new second set of m pairs of signal strengths and updates the threshold by setting the threshold in the range defined as having the detected new pair of first and second minimum reception signals as end values.

The signal strength detecting means preferably receives a plurality of packets transmitted from the n radio devices and each including routing information, and detects the first set of m pairs of signal strengths.

The threshold determining means preferably determines a first threshold used to register the radio device that has transmitted the radio wave as an adjacent radio device in a list of adjacent devices, and a second threshold having a prescribed difference from the first threshold and used to remove the radio device that has transmitted the radio wave from the list of adjacent devices, so that the first and second thresholds consist of maximum and minimum values of the radio wave characteristic corresponding to each other, and the table producing means registers a radio device that has transmitted a radio wave having a radio wave characteristic equal to or more than the determined first threshold to the list of adjacent devices to produce the routing table, and removes a radio device that has transmitted a radio wave having a radio wave characteristic lower than the determined second threshold from the list of adjacent devices to update the routing table.

The radio wave characteristic is preferably the reception strength of the radio wave, and the threshold determining means includes signal strength detecting means carrying out signal strength detection processing to detect the first set of m (m is an integer equal to or more than a prescribed number) pairs of signal strengths including m maximum reception signal strengths and m minimum reception signal strengths corresponding to the m maximum reception signal strengths based on the plurality of received radio waves, rearranging means carrying out rearranging processing to rearrange the detected first set of m pairs of signal strengths so that the m maximum reception signal strengths are in descending or ascending order to produce a second set of m pairs of signal strengths, and determining means detecting adjacent first and second maximum reception signal strengths having the largest difference among the m maximum reception signal strengths of the second set of m pairs of signal strengths and first and second minimum reception signal strengths corresponding to the first and second maximum reception signal strengths, determining the first threshold based on the detected first and second maximum reception signal strengths and determining the second threshold based on the detected first and second minimum reception signal strengths.

The radio characteristic is preferably the reception strength of the radio wave, and the threshold determining means includes signal strength detecting means carrying out signal strength detection processing to detect the first set of m (m is an integer equal to or more than a prescribed number) pairs of signal strengths including m maximum reception signal strengths and m minimum reception signal strengths corresponding to the m maximum reception signal strengths based on the plurality of received radio waves, rearranging means carrying out rearranging processing to rearrange the detected first set of m pairs of signal strengths so that the m maximum reception signal strengths are in descending or ascending order to produce a second set of m pairs of signal strengths, and determining means determining a reception signal strength having a prescribed difference from a threshold for packet error as the second threshold and a maximum reception signal strength corresponding to the minimum reception signal strength when the second threshold crosses a curve connecting the m minimum reception signal strengths of the second set of m pairs of signal strengths as the first threshold.

In the radio device according to the invention, a threshold used to detect all the reception signal strengths of radio waves transmitted and received in a stable radio wave environment is determined and a routing table is produced based on the routing information of routes having a reception signal strength equal to or more than the determined threshold. Consequently, frequent rewriting of the routing table can be reduced.

Therefore, according to the invention, stable routing is enabled.

BRIEF DESCRIPTION OF THE DRAWINGS

FIG. 3 is a diagram showing the structure of an IP header.

FIG. 4 is a diagram showing the structure of a TCP header.

FIG. 12A is a first table showing another neighbor list.

FIG. 12B is a second table showing another neighbor list.

FIG. 12C is a third table showing yet another neighbor list.

FIG. 12D is a fourth table showing yet another neighbor list.

FIG. 13A is a fifth table showing yet another neighbor list.

FIG. 13B is a sixth table showing a still further neighbor list.

FIG. 13C is a table showing a routing table.

BEST MODE FOR CARRYING OUT THE INVENTION

Figure 1:
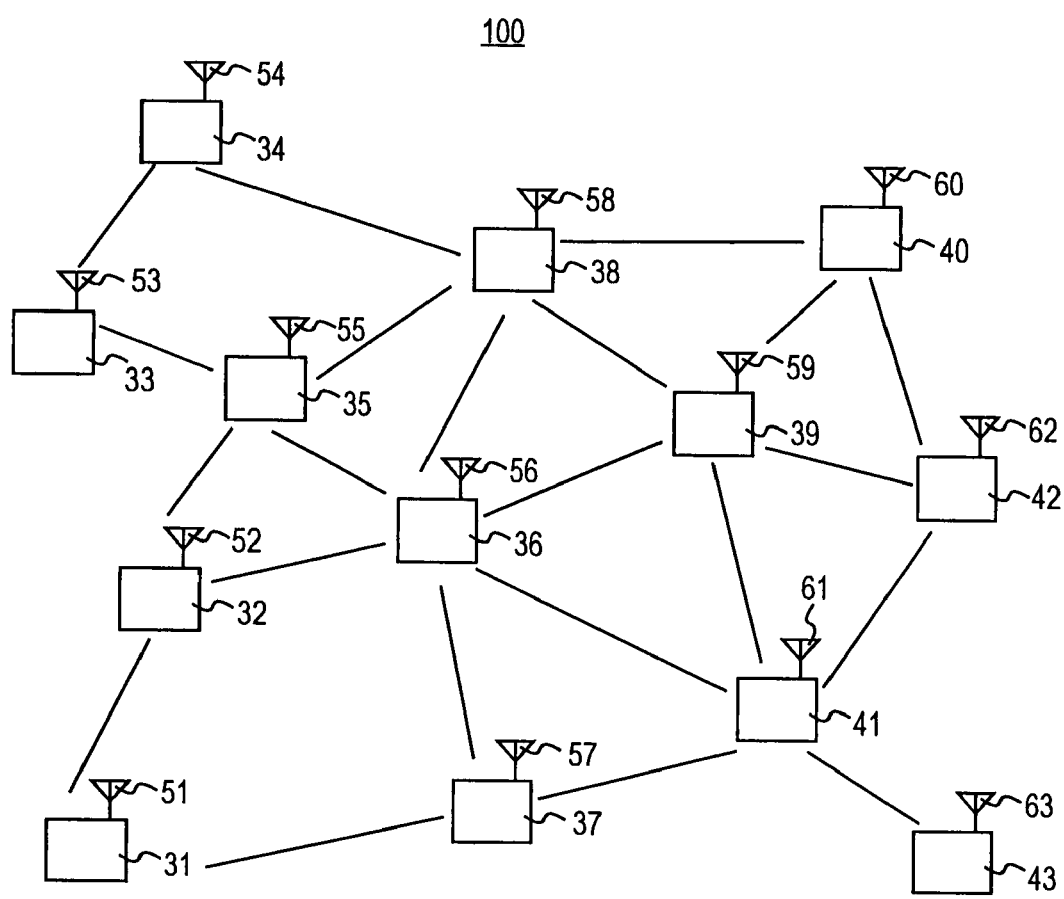
FIG. 1 is a schematic diagram of a radio network system using radio devices according to an embodiment of the invention.

Embodiments of the invention will be described in detail in conjunction with the accompanying drawings in which the same or corresponding portions are denoted by the same reference characters, and their description will not be repeated.

FIG. 1 is a schematic diagram of a radio network system using radio devices according to an embodiment of the invention. A radio network system 100 includes radio devices 31 to 43. The radio devices 31 to 43 are provided in a radio communication space and autonomously form a network. Antennas 51 to 63 are mounted to the radio devices 31 to 43, respectively.

When for example data is transmitted from the radio device 31 to the radio device 42, the radio devices 32 and 35 to 41 relay the data from the radio device 31 to the radio device 42.

In this way, the radio device 31 can carry out radio communication with the radio device 42 through various routes. More specifically, the radio device 31 can carry out radio communication with the radio device 42 either through the radio devices 37 and 41, or through the radio devices 32, 36, and 39, or through the radio devices 32, 35, 38, and 40.

When the radio communication is carried out through the radio devices 37 and 42, the hop number is "3" which is the smallest, when the radio communication is carried out through the radio devices 32, 36, and 39, the hop number is "4" and when the radio communication is carried out through the radio devices 32, 35, 38, and 40, the hop number is "5" which is the largest.

Therefore, if the route through the radio devices 37 and 41 is selected to carry out radio communication, the hop number is "3" which is the smallest.

However, the use of the route from the radio device 31 through the radio devices 37 and 41 to the radio device 42 does not necessarily secure stable radio communication between the radio device 31 and the radio device 42.

Therefore, in the following paragraphs, a method of producing a routing table including a stable route and carrying out radio communication between the source and the destination based on the produced routing table in the radio network system 100 will be described.

Note that the OLSR protocol is employed as an example of protocol used to establish a transmission path between the source and the destination. The OLSR protocol is a table driven type routing protocol, according to which routing information is exchanged using Hello messages and TC (Topology Control) messages to produce a routing table.

First Embodiment

Figure 2:
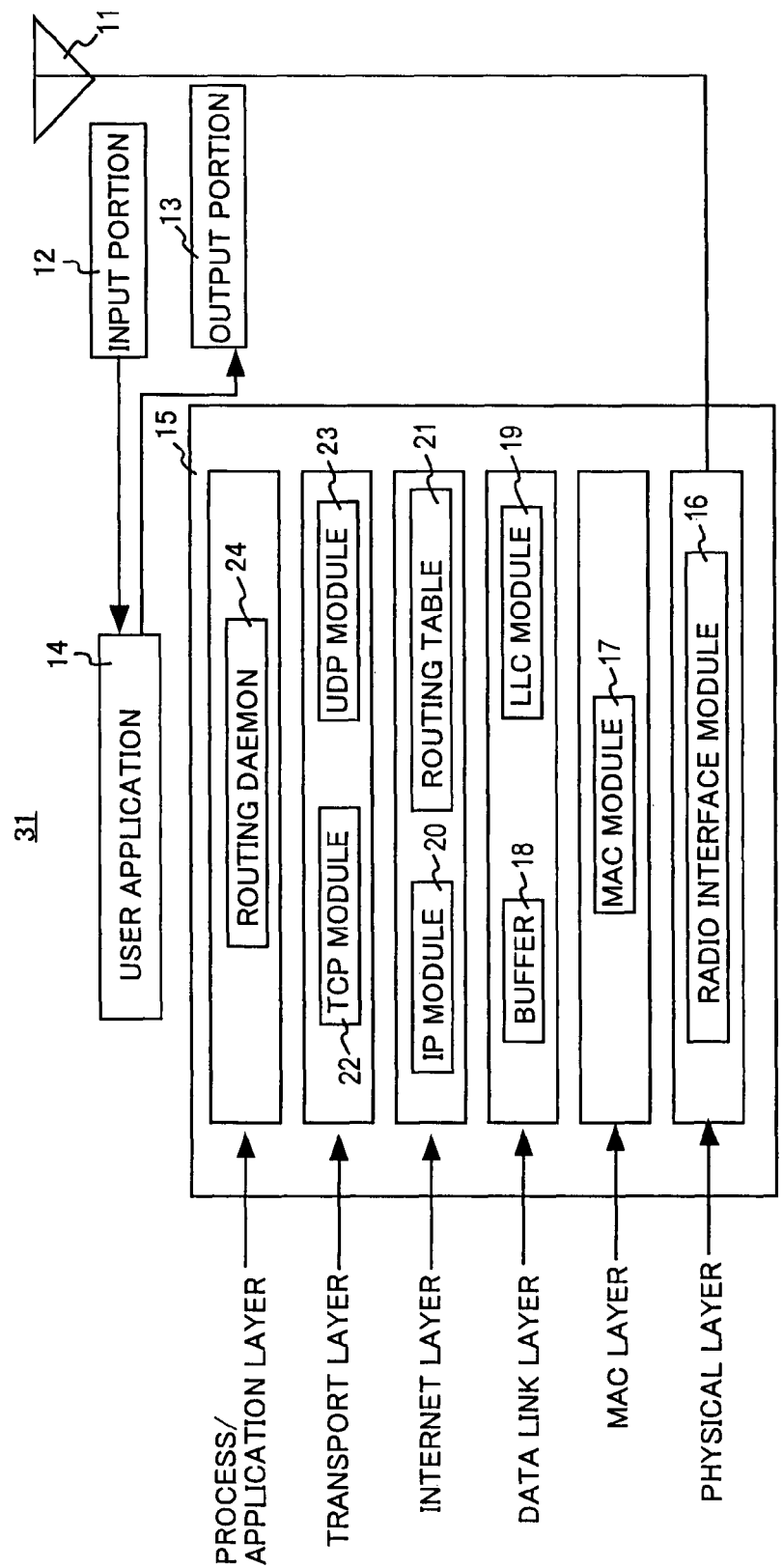
FIG. 2 is a schematic block diagram of the configuration of a radio device shown in FIG. 1 according to a first embodiment of the invention.

FIG. 2 is a schematic block diagram of the configuration of the radio device 31 shown in FIG. 1 according to a first embodiment of the invention. The radio device 31 includes an antenna 11, an input portion 12, an output portion 13, a user application 14, and a communication control unit 15.

The antenna 11 corresponds to each of the antennas 51 to 63 shown in FIG. 1. The antenna 11 receives data from another radio device through a radio communication space, outputs the received data to the communication control unit 15, and transmits data from the communication control unit 15 to another radio device through the radio communication space.

The input portion 12 accepts a message and the destination of data input by the operator of the radio device 1 and outputs the accepted message and destination to the user application 14. The output portion 13 displays the message according to control by the user application 14.

The user application 14 produces data based on the message and destination from the input portion 12 and outputs the data to the communication control unit 15.

The communication control unit 15 includes a plurality of modules that carry out communication control according to the ARPA (Advanced Research Projects Agency) Internet hierarchical structure. More specifically, the communication control unit 15 includes a radio interface module 16, a MAC (Media Access Control) module 17, a buffer 18, an LLC (Logical Link Control) module 19, an IP (Internet Protocol) module 20, a routing table 21, a TCP module 22, a UDP module 23, and a routing daemon 24.

The radio interface module 16 belongs to the physical layer and modulates/demodulates transmission signals or reception signals according to a prescribed specification and transmits/receives signals through the antenna 11. The radio interface module 16 detects the reception signal strength of a Hello packet received by the antenna 11 from another radio device and outputs the detected reception signal strength to the routing daemon 24.

The MAC module 17 belongs to the MAC layer and carries out an MAC protocol to perform various functions that will be described.

More specifically, the MAC module 17 broadcasts the Hello packet received from the routing daemon 24 through the radio interface module 16.

The MAC module 17 carries out re-transmission control of data (packets).

The buffer 18 belongs to the data link layer and temporarily stores packets.

The LLC module 19 belongs to the data link layer, and connects and releases a link between adjacent radio devices by carrying out an LLC protocol.

The IP module 20 belongs to the Internet layer and generates an IP packet. The IP packet includes an IP header and an IP data portion used to store a packet of a higher order protocol. Upon receiving data from the TCP module 22, the IP module 20 stores the received data in the IP data portion and produces the IP packet.

In this way, the IP module 20 searches the routing table 21 according to the OLSR protocol that is a table driven type routing protocol and determines a route through which the generated IP packet is to be transmitted. The IP module 20 then transmits the IP packet to the LLC module 19 and transmits the IP packet to the destination in the determined route.

The routing table 21 belongs to the Internet layer and stores routing information in association with each destination as will be described.

The TCP module 22 belongs to the transport layer and produces a TCP packet. The TCP packet includes a TCP header and a TCP data portion used to store data of a higher-order protocol. The TCP module 22 transmits the produced TCP packet to the IP module 20.

The UDP module 23 belongs to the transport layer, broadcasts an Update packet produced by the routing daemon 24, receives an Update packet broadcast by another radio device and outputs the packet to the routing daemon 24.

The routing daemon 24 belongs to the process/application layer, monitors the state of execution of other communication control modules, and processes requests from the other communication control modules.

The routing daemon 24 determines a threshold used to determine whether the reception signal strength is equal to or more than the minimum strength of waves transmitted/received in a stable radio wave environment by a method that will be described, and dynamically produces a routing table 21 in the Internet layer by calculating the optimum route based on the routing information of the Hello packet having a reception signal strength equal to or more than the determined threshold.

The routing daemon 24 produces a Hello packet including various messages such as information related to adjacent radio devices and outputs the produced Hello packet to the MAC module 17 upon transmitting the routing information in the radio network system 100 to another radio device.

Note that the radio devices 32 to 43 in FIG. 1 each have the same configuration as that of the radio device 31 shown in FIG. 2.

FIG. 3 shows the structure of the IP header. The IP header includes a version, a header length, a service type, a packet length, an ID number, a flag, a fragment offset, time to live, a protocol, a header checksum, a source IP address, a destination IP address, and an option.

FIG. 4 shows the structure of the TCP header. The TCP header includes a source port number, a destination port number, a sequence number, an acknowledgment (ACK) number, a data offset, a reservation, a flag, a window size, a header checksum, and an urgent pointer.

The source port number is a number used to specify the application that has output a TCP packet among a plurality of applications in operation at the source radio device. The destination port number is a number used to specify the application that delivers a TCP packet among a plurality of applications in operation at the destination radio device.

The TCP communication is an end-to-end connection type communication protocol. The TCP module 22 of a radio device that requests a TCP communication connection (herein after referred to as "TCP communication connection requester") transmits a first packet that indicates a connection request having SYN (Synchronize Flag) set at the Code Bit in the TCP header to the TCP module 22 of a terminal to accept the TCP communication connection (herein after referred to as "TCP communication connection acceptor") when a connection is established. In response, the TCP module 22 of the TCP communication connection acceptor transmits a second packet that indicates the connection request acceptance and the completion of the connection having SYN and ACK (acknowledgment) set at the Code Bit in the TCP header to the TCP module 22 of the TCP communication connection requester. Then, in response, the TCP module 22 of the TCP communication connection requester transmits a third packet that indicates the completion of the connection having ACK (acknowledgement) set at the Code Bit in the TCP header to the TCP module 22 of the TCP communication connection acceptor.

A disconnection request can be made either from the TCP communication connection requester or the TCP communication connection acceptor. The TCP module 22 of a radio device that requests TCP communication disconnection (herein after referred to as "TCP communication disconnection requester") transmits a first packet that indicates a disconnection request having FIN (Finish Flag) set at the Code Bit in the TCP header to a radio device to accept the TCP communication disconnection (herein after referred to as "TCP communication disconnection acceptor") when the connection is disconnected. In response, the TCP module 22 of the TCP communication disconnection acceptor transmits a second packet that indicates disconnection request acceptance having ACK (acknowledgment) set at the Code Bit in the TCP header and a third packet that indicates the completion of the disconnection having FIN set at the Code Bit in the TCP header to the TCP module 22 of the TCP communication disconnection requester. In response, the TCP module 22 of the TCP communication disconnection requester transmits a fourth packet that indicates the completion of disconnection having ACK (acknowledgement) set at the Code Bit in the TCP header to the TCP module 22 of the TCP communication disconnection acceptor.

Figure 5:
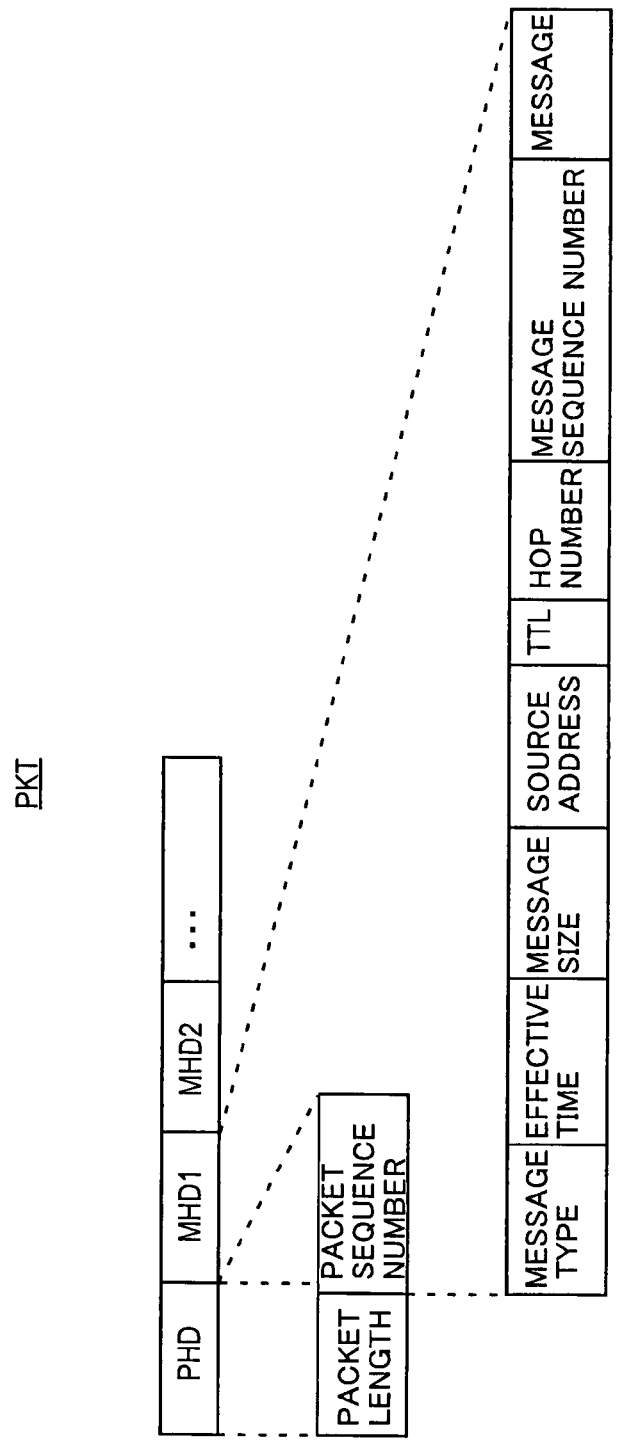
FIG. 5 is a diagram showing the structure of a packet PKT in the OLSR protocol.

FIG. 5 shows the structure of a packet PKT in the OLSR protocol. The packet PKT includes a packet header PHD, message headers MHD1, MHD2, . . . Note that the packet PKT is transmitted/received using the port number 698 of the UDP module 23.

The packet header PHD includes a packet length and a packet sequence number. The packet length includes 16-bit data and represents the byte number of the packet. The packet sequence number includes 16-bit data and is used to specify which packet is new. The packet sequence number is incremented by "1" every time a new packet is generated. Therefore, larger packet numbers represent newer packets PKT.

The message headers MHD1, MHD2, . . . each include a message type, effective time, a message size, a source address, a TTL, a hop number, a message sequence number, and a message.

The message type includes 8-bit data and represents the type of the message written in the message main body, and 0 to 127 have been reserved. The effective time includes 8-bit data and represents time for which the message must be maintained after the reception. The effective time includes a mantissa part and an exponent part.

The message size includes 16-bit data and represents the length of the message. The source address includes 32-bit data and represents the radio device that has produced the message. The TTL includes 8-bit data and specifies the maximum hop number with which a message is to be transferred. The TTL is decremented by "1" every time the message is transferred. If the TTL is "0" or "1", the message will not be transferred. The hop number includes 8-bit data and represents the hop number from the generator of the message. The hop number is initially set to "0" and incremented by "1" for every transfer. The message sequence number includes 16-bit data and represents an identification number allocated to each message. The message sequence number is incremented by "1" every time a message is produced. The message is a message to be transmitted.

In the OLSR protocol, various kinds of messages are transmitted and received using packets PKT having the structure shown in FIG. 5.

Figures 6, 7:
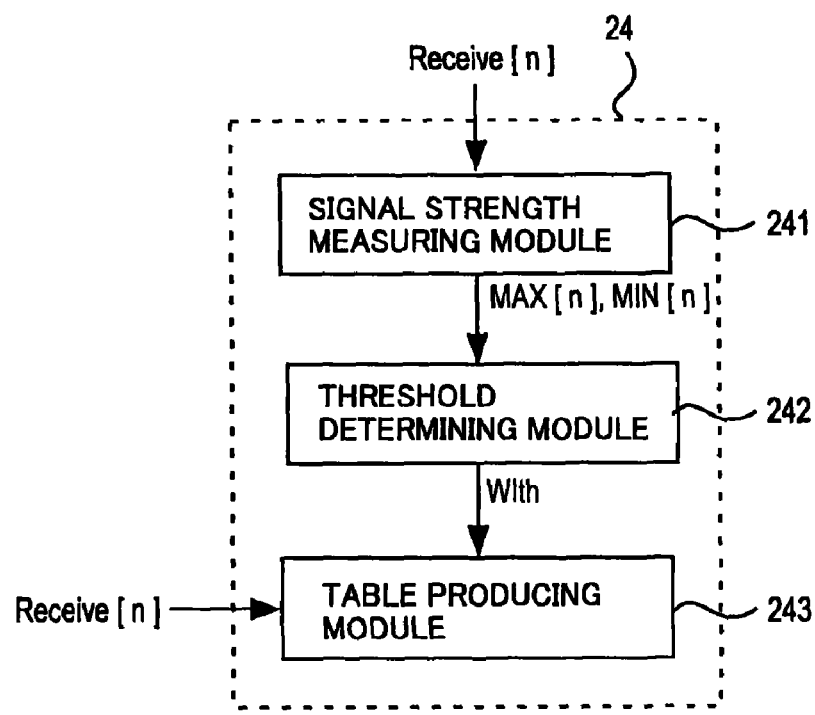
FIG. 6 is a diagram of the routing table shown in FIG. 2.
FIG. 7 is a functional block diagram of the routing daemon in FIG. 2.

FIG. 6 shows the structure of the routing table 21 in FIG. 2. The routing table 21 includes a destination, the next radio device, and a hop number. The destination, the next radio device, and the hop number are associated with one another. The "destination" represents the IP address of the radio device at the destination. The "next radio device" represents the IP address of the radio device to which the packet PKT is to be transmitted next when the packet is transmitted to the destination. The "hop number" represents the hop number to the destination. In FIG. 1, for example if radio communication is carried out between the radio device 31 and the radio device 42 using the route from the radio device 31 through the radio device 32, the radio device 36, and the radio device 39 to the radio device 42, "3" is stored for the hop number in the routing table 21 of the radio device 32.

FIG. 7 is a functional block diagram of the routing daemon 24 shown in FIG. 2. The routing daemon 24 includes a signal strength measuring module 241, a threshold determining module 242, and a table producing module 243.

The signal strength measuring module 241 receives a plurality of reception signal strengths Receive [n] in Hello packets received at the antenna 11 from the radio interface module 16, detects m (a prescribed number such as an integer not less than five) pairs of maximum and minimum values MAX[n] and MIN[n] including m pairs of maximum values MAX[n] and m pairs of minimum values MIN[n] corresponding to the m maximum values MAX[n] and outputs the detected m pairs of maximum and minimum values MAX[n] and MIN[n] to the threshold determining module 242.

Figure 10:
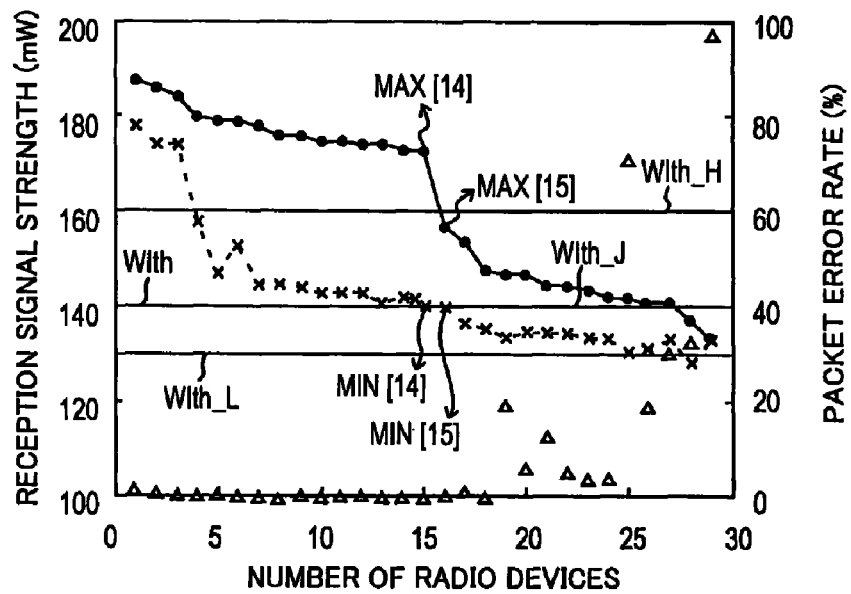
FIG. 10 shows the relation between the reception signal strength and the packet error rate and the number of radio devices when a plurality of maximum values are rearranged in descending order.

Note that m is set to a prescribed value (such as an integer not less than five) because if at least five pairs of maximum and minimum values MAX[1] and MIN[1] to MAX[m] and MIN[m] can be detected, a threshold WIth used to detect all the reception signal strengths of radio waves transmitted/received in a stable radio wave environment can be determined highly reliably based on those at least five pairs of maximum and minimum values MAX[1] and MIN[1] to MAX [m] and MIN[m] as will be described in conjunction with FIG. 10.

The threshold determining module 242 determines the threshold WIth based on the m pairs of maximum and minimum values MAX[n] and MIN[n] from the signal strength measuring module 241 by the method that will be described and outputs the determined threshold WIth to the table producing module 243.

Upon receiving the threshold WIth from the threshold determining module 242, the table producing module 243 compares the reception signal strengths Receive [n] of the Hello packets received from the radio interface module 16 to the threshold WIth, extracts Hello packets having a reception signal strength Receive [n] equal to or more than the threshold WIth, and dynamically produces a routing table 21 shown in FIG. 6 based on the extracted Hello packets.

How the routing table 21 according to the OLSR protocol is produced will be described in detail. The radio devices 31 to 43 each transmit/receive Hello messages and TC messages in order to produce a routing table 21.

The Hello message is regularly transmitted in order to distribute information the radio devices 31 to 43 have. The radio devices 31 to 43 each receive the Hello messages and then collect information related to adjacent radio device, and determine which radio devices are present around each device.

In the OLSR protocol, the radio devices 31 to 43 each manage local link information. The Hello message is a message used to form and transmit the local link information. The local link information includes a "link set," an "adjacent radio device set," an "two-hop neighbor radio device set and a link set to these radio devices," an "MPR (Multi-point Relay) set" and an "MPR selector set."

The link set is the set of radio devices to which radio waves can directly arrive (adjacent radio devices), and each link is represented by the effective time of a pair of addresses for two radio devices. Note that the effective time is also used to represent whether the link is one-way or two-way.

The adjacent radio device set includes the addresses of the adjacent radio devices and the willingness of retransmission of the radio devices. The two-hop neighbor radio device set represents a set of radio devices neighboring the adjacent radio devices.

The MPR set is a set of radio devices selected as MPRs. Note that an MPR is a relay selected so that the radio devices 31 to 43 each transmit the packet PKT only once occasion when each packet PKT is transmitted to all the radio devices 31 to 43 in the radio network system 100.

The MPR selector set represents a set of the other radio devices that have selected the radio device as one of their MPRs.

The process of how the local link is established is generally as follows. A Hello message including its own address is transmitted by each of the radio devices 31 to 43 to an adjacent radio device in order to notify their presence. This is carried out by all the radio devices 31 to 43, and the radio devices 31 to 43 are notified of the presence of the radio devices around them and as to which addresses these radio devices have. In this way, the link set and the adjacent radio device set are formed.

The formed local link information continues to be transmitted by Hello messages on a regular-basis. This is repeated to gradually clarify if each link is two-way or which radio device exists beyond the adjacent radio devices. The radio devices 31 to 43 each include local link information gradually formed in this manner.

Information related to MPR is also regularly transmitted by Hello messages and notified to the radio devices 31 to 43. The radio devices 31 to 43 each select several radio devices among adjacent radio devices as a MPR set and ask these radio devices to retransmit a packet PKT transmitted from them. Information related to the MPR set is transmitted to the adjacent radio devices by Hello messages, and therefore the radio device that receives the Hello message manages the set of the radio devices selected itself as MPRs as "MPR selector set." In this way, the radio devices 31 to 43 each can instantaneously determine whether a packet PKT received from a radio device should be retransmitted.

Once a local link set is formed in each of the radio devices 31 to 43 by transmission/reception of Hello messages, a TC message to notify the topology of the entire radio network system 100 is transmitted to the radio devices 31 to 43. The TC message is transmitted regularly by all the radio devices selected as MPRs. The TC messages include links between the radio devices and the MPR selector set, and therefore all the radio devices 31 to 43 in the radio network system 100 can be informed of all the MPR sets and all the MPR selector sets and of the topology of the entire radio network system 100 based on all the MPR sets and all the MPR selector sets. The radio devices 31 to 43 each calculate the shortest routes using the topology of the entire radio network system 100 and produces a route table based on the routes.

Note that the radio devices 31 to 43 frequently exchange TC messages separately from the Hello messages. The MPR are also used to exchange the TC messages.

The UDP module 23 of each of the radio devices 31 to 43 transmits/receives the above-described Hello messages and the TC messages, and the table producing module 243 of the routing daemon 24 recognizes the topology of the entire radio network system 100 based on Hello messages and TC messages having a reception signal strength equal to or more than the threshold WIth among the Hello messages and TC messages received by the UDP module 23, calculates the shortest route based on the topology of the entire radio network system 100, and dynamically produces the routing table 21 shown in FIG. 6.

Now, a method of determining the threshold WIth will be described. How the radio device 36 shown in FIG. 1 determines the threshold WIth will be described by way of illustration.

When the radio device 36 determines the threshold WIth, the radio device 36 detects a plurality of reception signal strengths as the reception strengths of a plurality of Hello packets received during a prescribed period from the radio devices 32, 35, 37 to 39, and 41 within one hop, and extracts the maximum value MAX[n] and the minimum NIN[n] of the reception signal strengths from the plurality of detected reception signal strengths.

More specifically, in the radio device 36, the signal strength measuring module 241 in the routing daemon 24 sequentially receives the m reception signal strengths Receive[32]1 to Receive[32]m of m Hello packets sequentially received from the radio device 32 for a prescribed period through the radio interface module 16. The signal strength measuring module 241 detects a pair of maximum and minimum values MAX[32] and MIN[32] of the sequentially received m reception signal strengths Receive [32]1 to Receive [32]m.

In this case, the signal strength measuring module 241 sets the first reception signal strength Receive[32]1 as the maximum value MAX[32] and the minimum value MIN[32] and sequentially compares the reception signal strengths Receive [32]2 to Receive[32]m received second and on to the maximum value MAX[32] and the minimum value MIN[32]. The signal strength measuring module 241 updates the maximum value MAX[32] by the reception signal strengths Receive [32]2 to Receive[32]m if the reception signal strengths Receive[32]2 to Receive[32]m are larger than the maximum value MAX[32], updates the minimum value MIN[32] by the reception signal strengths Receive[32]2 to Receive[32]m if the Receive[32]2 to Receive[32]m are smaller than the minimum value MIN[32], and thus detects the pair of the maximum and minimum values MAX[32] and MIN[32].

The signal measuring module 241 sequentially receives, through the radio interface module 16, m reception signal strengths Receive[35]1 to Receive[35]m, Receive[37]1 to Receive[37]m, Receive[38]1 to Receive[38]m, Receive[39]1 to Receive[39]m, and Receive[41]1 to Receive[41]m sequentially received from the radio devices 35, 37, 38, 39, and 41 for a prescribed period and similarly detects pairs of maximum and minimum values MAX[35] and MIN[35]; MAX[37] and MIN[37]; MAX[38] and MIN[38]; MAX[39] and MIN[39]; and MAX[41] and MIN[41] based on the m received reception signal strengths Receive[35]1 to Receive[35]m, Receive[37]1 to Receive[37]m, Receive[38]1 to Receive[38]m, Receive[39]1 to Receive[39]m, and Receive[41]1 to Receive[41]m.

The signal strength measuring module 241 outputs the detected six pairs of maximum and minimum values MAX[32] and MIN[32]; MAX[35] and MIN[35]; MAX[37] and MIN[37]; MAX[38] and MIN[38]; MAX[39] and MIN[39]; and MAX[41] and MIN[41] as six pairs of maximum and minimum values MAX[0] and MIN[0]; MAX[1] and MIN[1]; MAX[2] and MIN[2]; MAX[3] and MIN[3]; MAX[4] and MIN[4]; and MAX[5] and MIN[5] to the threshold determining module 242.

Figure 8:
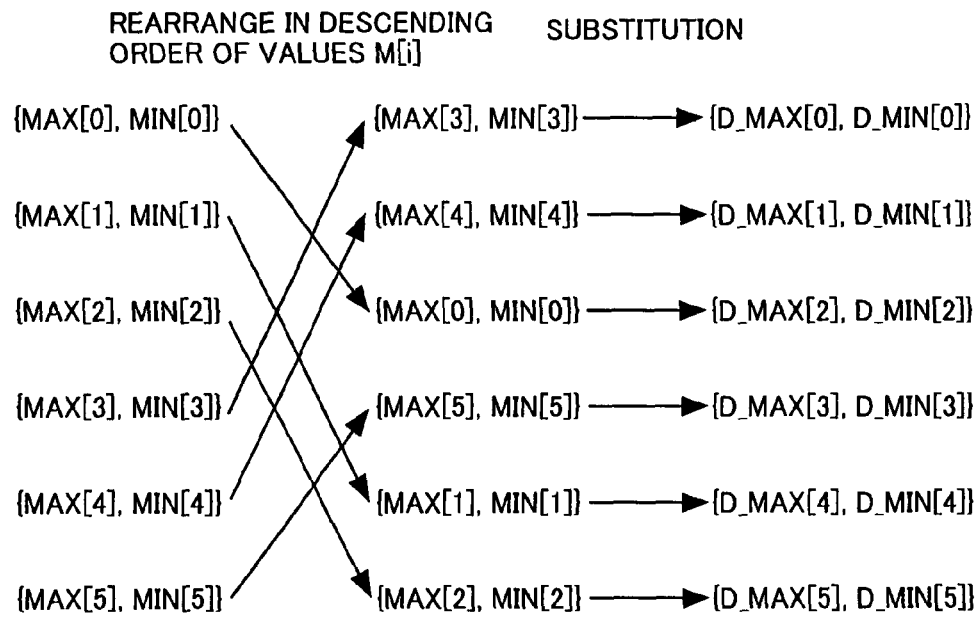
FIG. 8 shows the concept of rearrangement.

FIG. 8 shows how rearrangement is performed. The threshold determining module 242 receives the six pairs of maximum and minimum values MAX [0] and MIN[0]; MAX[1] and MIN[1]; MAX[2] and MIN[2]; MAX[3] and MIN[3]; MAX[4] and MIN[4]; and MAX[5] and MIN[5] from the signal strength measuring module 241 and rearranges the six pairs of maximum and minimum values MAX[0] and MIN[0]; MAX[1] and MIN[1]; MAX[2] and MIN[2]; MAX[3] and MIN[3]; MAX[4] and MIN[4]; and MAX[5] and MIN[5] so that the six maximum values MAX[0], MAX[1], MAX[2], MAX[3], MAX[4], and MAX[5] are in descending order.

More specifically, the threshold determining module 242 rearranges them in the order of the pairs of maximum and minimum values MAX[3] and MIN[3]; MAX[4] and MIN[4]; MAX[0] and MIN[0]; MAX[5] and MIN[5]; MAX[1] and MIN[1]; and MAX[2] and MIN[2], and assigns the pairs of maximum and minimum values MAX[3] and MIN[3]; MAX[4] and MIN[4]; MAX[0] and MIN[0]; MAX[5] and MIN[5]; MAX[1] and MIN[1]; and MAX[2] and MIN[2] as a second set of pairs of maximum and minimum values {D_MAX[0], D_MIN[0]}, {D_MAX[1], D_MIN[1]}, {D_MAX[2], D_MIN[2]}, {D_MAX[3], D_MIN[3]}, {D_MAX[4], D_MIN[4]}, and {D_MAX[5], D_MIN[5]}, respectively.

Then, the threshold determining module 242 detects two adjacent maximum values having the largest difference among the six maximum values D_MAX[0] to D_MAX[5], and two pairs of maximum and minimum values {D_MAX[i], D_MIN[i]} and {D_MAX[i+1], D_MIN[i+1]} including the two adjacent maximum values and determines the average of the two minimum values D_MIN[i] and D_MIN[i+1] included in the detected two pairs of maximum and minimum values {D_MAX[i], D_MIN[i]} and {D_MAX[i+1], D_MIN[i+1]} as the threshold WIth.

Figure 9:
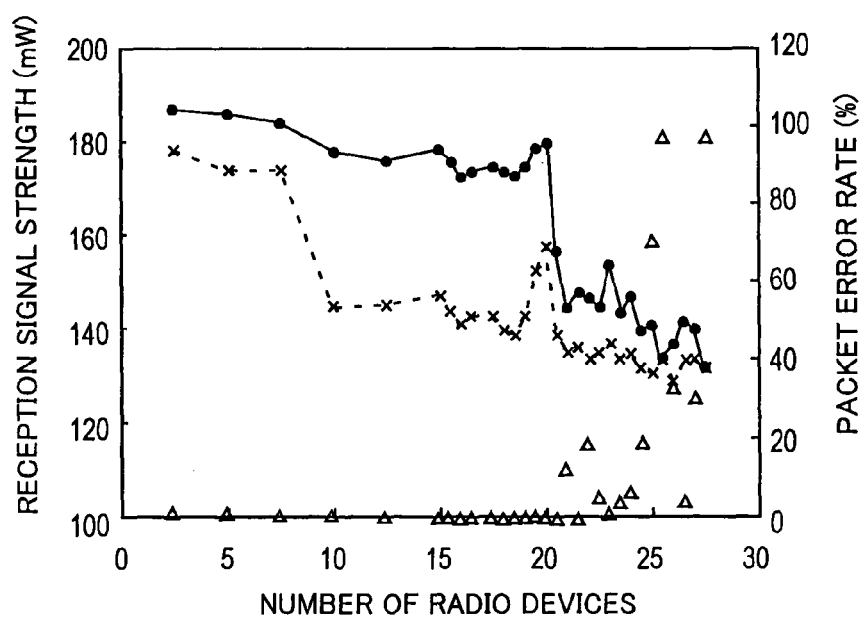
FIG. 9 shows the relation between the reception signal strength and the number of radio devices.

A result of experiments carried out to determine the threshold WIth will be described. FIG. 9 shows the relation of the reception signal strength and the packet error rate with respect to the number of radio devices. In FIG. 9, the ordinate represents the reception signal strength and the packet error rate, and the abscissa represents the number of radio devices.

FIG. 9 shows the plots of the pairs of maximum and minimum values MAX[n] and MIN[n] of the reception signal strengths of Hello packets received from a plurality of radio devices within one hop for a prescribed period. In this case, "•" represents the maximum value MAX[n] of the reception signal strengths, "x" represents the minimum value MIN[n] of the reception signal strengths, and "Δ" represents the packet error rate.

FIG. 10 shows the relation of the reception signal strengths and the packet error rate with respect to the number of the radio devices when a plurality of maximum values are rearranged in descending order. In FIG. 10, the ordinate represents the reception signal strength and the packet error rate, and the abscissa represents the number of radio devices. In this case, "•" represents the maximum value MAX[n] of the reception signal strengths, "x" represents the minimum value MIN[n] of the reception signal strengths, and "Δ" represents the packet error rate.

As can be clearly understood from FIG. 9, the maximum values vary as the number of radio devices increases and are not in descending order. Therefore, the plurality of pairs of maximum and minimum values are rearranged so that the maximum values are in descending order as shown in FIG. 10.

Two pairs of maximum and minimum values {D_MAX(14), D_MIN(14)}, and {D_MAX(15), D_MIN(15)}, the two adjacent maximum values of which have the largest difference are detected and the average of the two minimum values D_MIN(14) and D_MIN(15) is determined as the threshold WIth.

In FIG. 10, in the region on the right of the pair of maximum and minimum values MAX[14] and MIN[14], the maximum values of the reception signal strengths are much lower, and the packet error rate varies.

Meanwhile, in the region on the left of the pair of maximum and minimum values MAX[15] and MIN[15], the maximum values of the reception signal strengths are larger and the packet error rate is about 0% if the number of radio devices increases. Therefore, in the region on the left of the pair of maximum and minimum values MAX[15] and MIN[15], all the reception signal strengths of the radio waves transmitted/received in a stable radio wave environment are distributed, and in the region on the right of the pair of maximum and minimum values MAX[14] and MIN[14], all the reception signal strengths of the radio waves transmitted/received in an unstable radio wave environment are distributed.

Consequently, detection of reception signal strengths equal to or more than the threshold WIth is equal to detection of all the radio waves transmitted/received in a stable radio wave environment.

Therefore, all the radio waves transmitted/received in a stable radio wave environment can be detected by determining the threshold WIth according to the above-described method and all the radio wave transmitted/received in an unstable radio wave environment can be excluded.

The threshold determining module 242 determines the threshold WIth and then outputs the determined threshold WIth to the table producing module 243.

Figure 11:
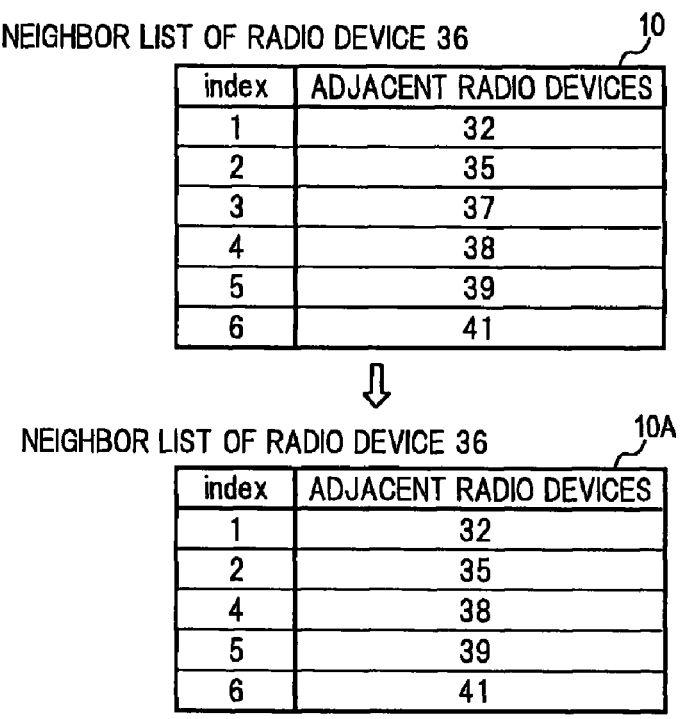
FIG. 11 shows neighbor lists including information related to adjacent radio devices.

A method of producing a routing table 21 will be described. FIG. 11 shows a neighbor list including information related to adjacent radio devices. FIGS. 12A to 12D show first to fourth tables for other neighbor lists, respectively. FIGS. 13A and 13B are fifth and sixth tables for other neighbor lists. FIG. 13C shows the routing table.

FIG. 11 shows the neighbor list stored by the radio device 36 shown in FIG. 1, FIGS. 12A to 12D show the neighbor lists stored by the radio devices 32, 35, 37, and 38, respectively shown in FIG. 1, and FIGS. 13A to 13C show the neighbor lists stored by the radio devices 39 and 41 shown in FIG. 1 and the routing table stored by the radio device 36.

In the radio device 36, the threshold determining module 242 determines a threshold WIth according to the above-described method and outputs the determined threshold WIth to the table producing module 243.

The table producing module 243 of the radio device 36 receives Hello packets PKT1 to PKT6 received from the radio devices 32, 35, 38, 37, 39, and 41 through the UDP module 23, and reads out the neighbor lists 10B, 10C, 10D, 10E, 10F, and 10G from the received Hello packets PKT1 to PKT6, respectively.

The table producing module 243 detects the radio devices 32, 35, 37, 38, 39, and 41 as being adjacent to the radio device 36 based on the read out neighbor lists 10B, 10C, 10D, 10E, 10F, and 10G and produces a neighbor list 10.

The table producing module 243 receives, through the radio interface module 16, reception signal strengths Receive [32], Receive[35], Receive[38], Receive[37], Receive[39], and Receive[41] when the Hello packets PKT1 to PKT6 are received.

In this way, the table producing module 243 compares each of the reception signal strengths Receive[32], Receive[35], Receive[38], Receive[37], Receive[39], and Receive[41] to the threshold WIth, and extracts reception signal strengths equal to or more than the threshold WIth from the reception signal strengths Receive[32], Receive[35], Receive[38], Receive[37], Receive[39], and Receive[41].

If for example only the reception signal strength Receive [37] is smaller than the threshold WIth, the table producing module 243 removes the radio device 37 from the neighbor list 10 and produces a neighbor list 10A. More specifically, the table producing module 243 selects the radio devices 32, 35, 38, 39, and 41 whose reception signal strengths are equal to or more than the threshold WIth among the radio devices 32, 35, 37, 38, 39, and 41 as adjacent radio devices to the radio device 36.

Thereafter, the table producing module 243 produces a routing table 21A based on the neighbor lists 10A, 10B, 10C, 10D, 10F, and 10G, and TC messages including information related to the topology (see FIG. 13C).

The table producing module 243 can detect the radio device 38 as being adjacent to the radio devices 36, 39, and 40 with reference to the neighbor list 10D and the radio device 39 as being adjacent to the radio devices 36 and 40 with reference to the neighbor list 10F. Consequently, the table producing module 243 detects the radio device 40 being positioned in a location "two hops" from the radio device 36 and produces a route in the first row of the routing table 21A.

The table producing module 243 can detect the radio device 39 as being adjacent to the radio devices 36 and 42 with reference to the neighbor list 10F and the radio device 41 as being adjacent to the radio devices 36, 39, and 42 with reference to the neighbor list 10G. Consequently, the table producing module 243 detects the radio device 42 being positioned in a location "two hops" from the radio device 36, and produces a route in the second row of the routing table 21A.

Furthermore, the table producing module 243 can detect the radio device 41 as being adjacent to the radio devices 36, 39, and 43 with reference to the neighbor list 10G. Consequently, the table producing module 243 detects the radio device 43 being positioned in a location "two hops" from the radio device 36 and produces a route in the third row of the routing table 21A.

As described above, the routing table 21 can be produced based on Hello packets transmitted/received in a stable radio wave environment by determining the threshold WIth.

Consequently, the information related to the radio devices adjacent to each radio device is not frequently changed and a stable routing table 21 can be produced, so that stable routing can be carried out.

Figure 14:
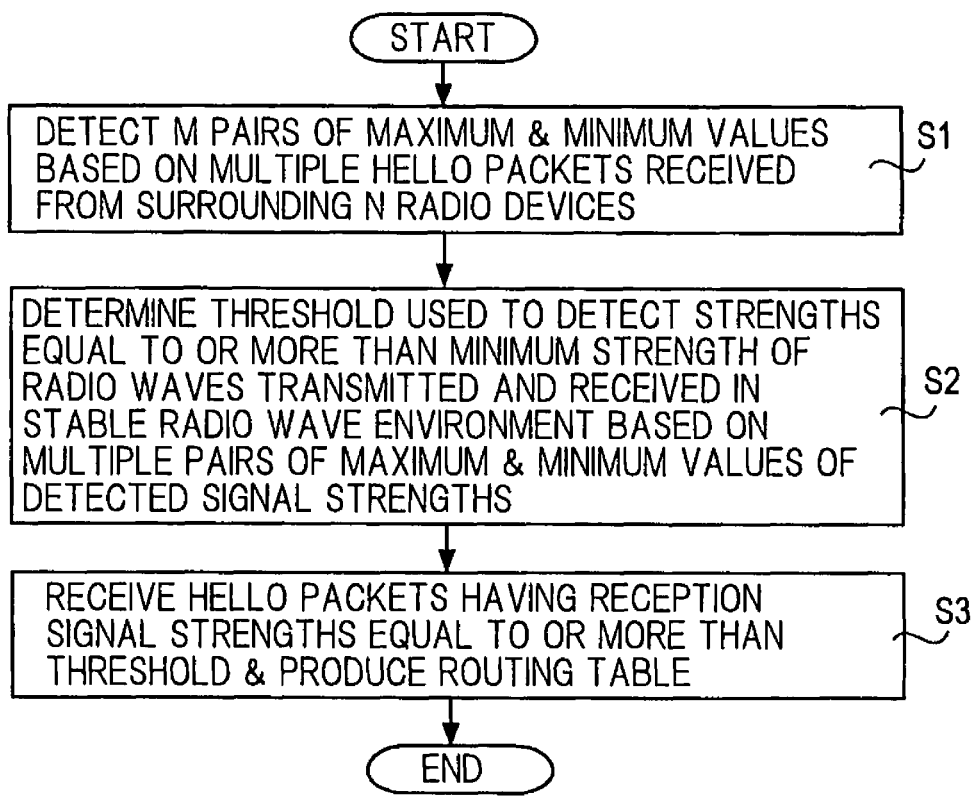
FIG. 14 is a flowchart for use in illustrating the operation of producing a routing table according to the first embodiment.

FIG. 14 is a flowchart for use in illustrating the series of operations for producing the routing table according to a first embodiment of the invention.

After the start of the series of operations, in each of the radio devices 31 to 43, the signal strength measuring module 241 of the routing daemon 24 detects m pairs of maximum and minimum values based on the plurality of reception signal strengths of a plurality of Hello packets received from surrounding n radio devices (step S1) and outputs the detected m pairs of maximum and minimum values to the threshold determining module 242.

The threshold determining module 242 sets a threshold WIth used to detect reception signal strengths equal to or more than the minimum strength of radio waves transmitted/ received in a stable radio wave environment based on the m pairs of maximum and minimum values received from the signal strength measuring module 241 (step S2).

The table producing module 243 receives the threshold WIth from the threshold determining module 242, receives Hello packets having reception signal strengths equal to or more than the received threshold WIth and produces a routing table 21 according to the method described above (step S3). In this way, the series of operations ends.

Figure 15:
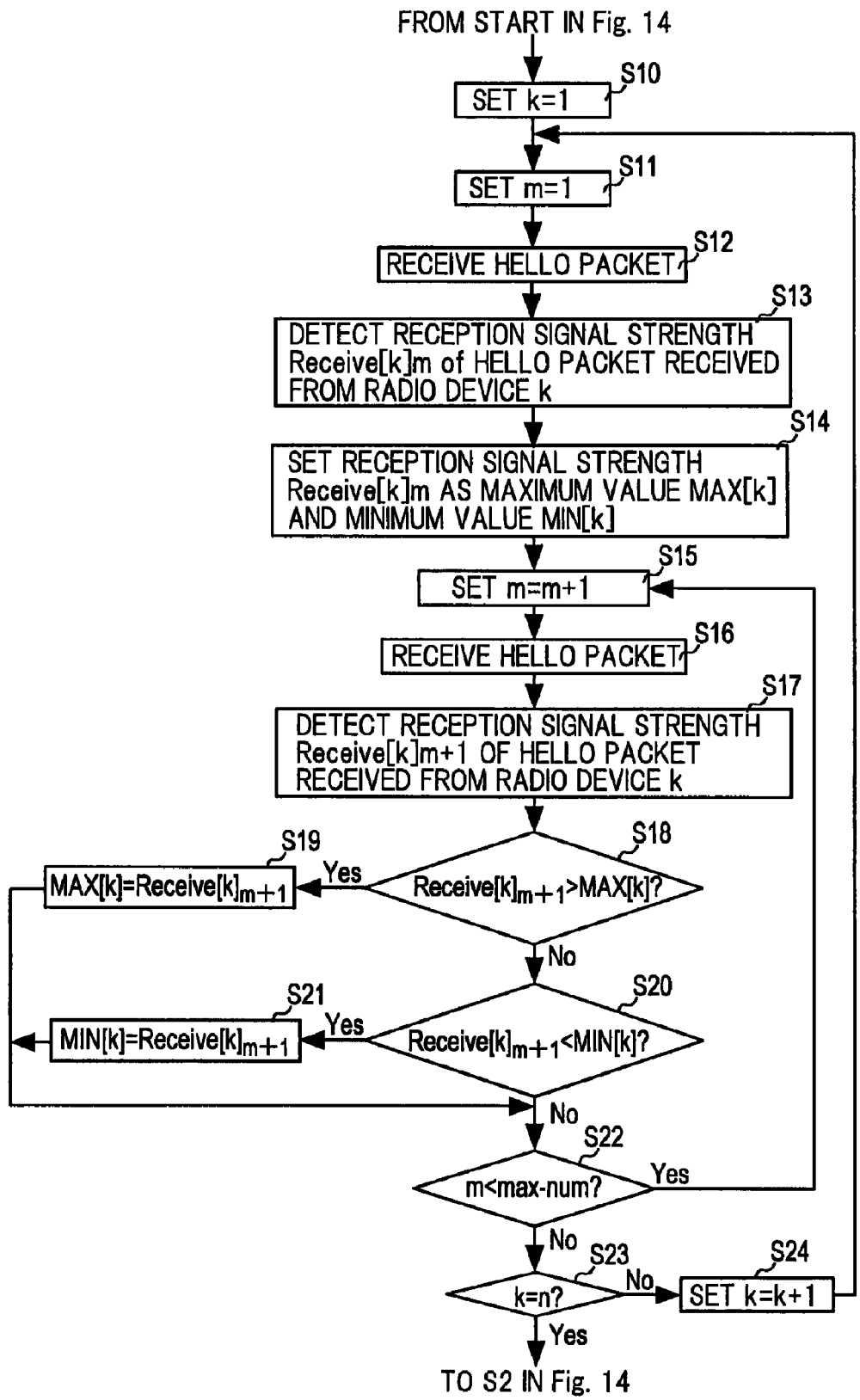
FIG. 15 is a flowchart for use in illustrating detailed operation in step S1 in FIG. 14.

FIG. 15 is a flowchart for use in illustrating detailed operation in step S1 in FIG. 14. Once the series of operations starts, the signal strength measuring module 241 sets k=1 (step S10) and m=1 (step S81), and receives a Hello packet from the UDP module 23 (step S12).

The radio interface module 16, upon receiving the Hello packet from a radio device k (k is information to identify the radio device), detects the reception signal strength Receive [k]m of the Hello packet as received, and outputs the detected strength to the signal strength measuring module 241 of the routing daemon 24.

The signal strength measuring module 241 receives the reception signal strength Receive[k]m from the radio interface module 16 and records the reception signal strength Receive [k]m of the Hello packet received from the radio device k (step S13).

The signal strength measuring module 241 sets the detected reception signal strength Receive [k]m as the maximum value MAX[k] and the minimum value MIN[k] of the reception signal strength (step S14). More specifically, the signal strength measuring module 241 initializes the maximum value MAX[k] and the minimum value MIN[k].

Thereafter, the signal strength measuring module 241 sets m=m+1 (step S15) and receives a Hello packet (step S16). The signal strength measuring module 241 detects the reception signal strength Receive[k]m+1 of the Hello packet received in step S16 by the same operation as that in step S13 (step S17).

Then, the signal strength measuring module 241 determines whether the reception signal strength Receive[k]m+1 is larger than the maximum value MAX[k] (step S18), and sets the reception signal strength Receive[k]m+1 as the maximum value MAX[k] if the reception signal strength Receive [k]m+1 is greater than the maximum value MAX[k] (step S19).

If it is determined in step S18 that the reception signal strength Receive[k]m+1 is equal to or less than the maximum value MAX[k], the signal strength measuring module 241 further determines whether the reception signal strength Receive[k]m+1 is smaller than the minimum value MIN[k]

(step S20). If the reception signal strength Receive[k]m+1 is smaller than the minimum value MIN[k], the signal strength measuring module 241 sets the reception signal strength Receive[k]m+1 as the minimum value MIN[k] (step S21).

If it is determined in step S20 that the reception signal strength Receive[k]m+1 is equal to or more than the minimum value MIN[k] or after step S19 or S21, the signal strength measuring module 241 determines whether m is smaller than max_num (step S22), and if m is smaller than max_num, the series of operations proceeds to step S15. The above-described steps S15 to S22 are repeatedly carried out until m reaches max_num in step S22.

The max_um represents the maximum number of Hello packets received during a prescribed period from one radio device, and for example, max_num is set to 30. The number 30 is based on the number of Hello packets received per minute.

Therefore, steps S15 to S22 are repeatedly carried out until it is determined in step 22 that a Hello packet has been received 30 times in a minute.

If it is determined in step S22 that the Hello packet receiving number m has reached max_num (=30), the signal strength measuring module 241 determines whether k=n (step S23), and sets k=k+1 if k is not equal ton (step S24), and then the series of operations proceeds to step S11. The above-described steps S11 to S24 are repeatedly carried out until it is determined in step S23 that k=n.

In the above, n represents the number of radio devices existing within one hop from each radio device, and more specifically, n represents the number of radio devices used to determine the above described threshold WIth. For example, n is set to "5." This is because if there are five radio devices within one hop from one radio device and the five radio devices regularly transmit Hello packets to the one radio device, the radio device can achieve the relation between the reception signal strength and the number of radio devices such as shown in FIG. 10, so that the threshold WIth can be determined highly reliably.

Then, if it is determined in step S23 that k=n, the series of operations proceeds to step S2 in FIG. 14.

In this way, according to the flowchart in FIG. 15, the signal strength measuring module 241 of one radio device sequentially receives m Hello packets from each of n radio devices existing within one hop from itself, detects pairs of maximum and minimum values MAX[k] and MIN[k] for each of the n radio devices based on the m reception signal strengths of the m Hello packets received, and outputs the detected n pairs of maximum and minimum values MAX[1] and MIN[1] to MAX[n] and MIN[n] to the threshold determining module 242.

Figure 16:
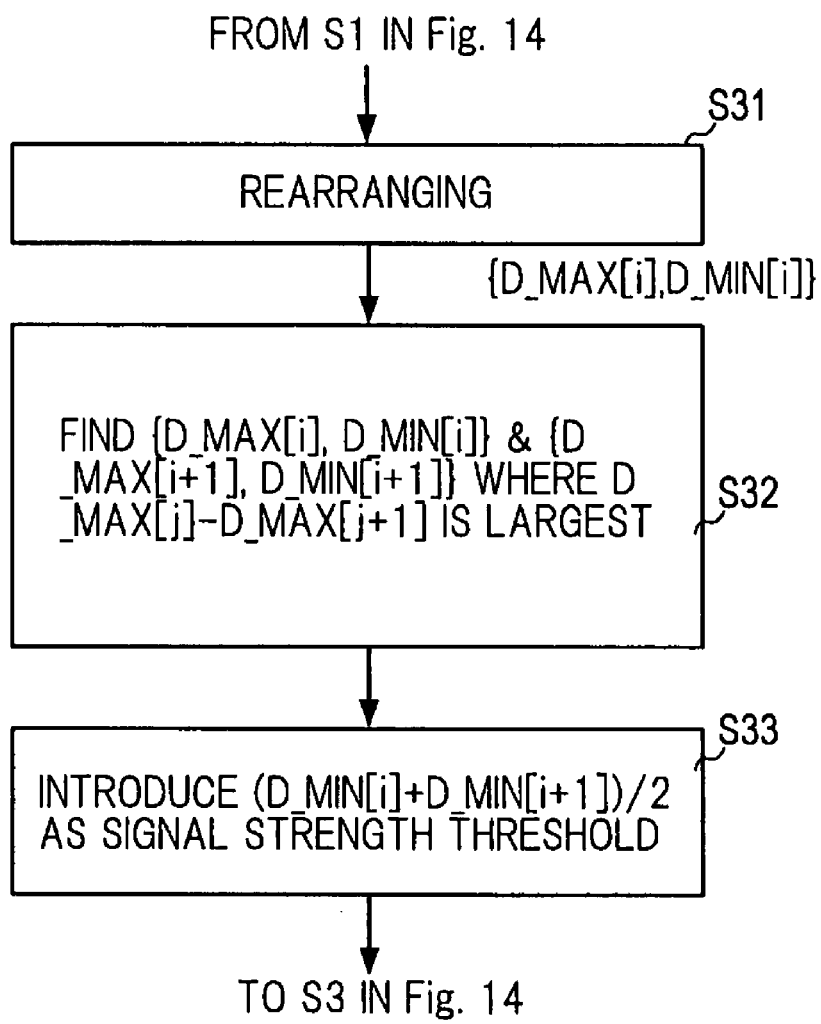
FIG. 16 is a flowchart for use in illustrating detailed operation in step S2 in FIG. 14.

FIG. 16 is a flowchart for use in illustrating detailed operation in step S2 in FIG. 14.

After the start of a series of operations, the threshold determining module 242 receives the n pairs of maximum and minimum values MAX[1] and MIN[1] to MAX[n] and MIN[n] from the signal strength measuring module 241, rearranges the n pairs of maximum and minimum values MAX[1] and MIN[1] to MAX[n] and MIN[n] so that the n maximum values MAX[1] to MAX[n] are in descending order (see FIG. 8), and assigns the rearranged n pairs of maximum and minimum values as n pairs of maximum and minimum values D_MAX[1] and D_MIN[1] to D_MAX[n] and D_MIN[n] (step S31).

The threshold determining module 242 sequentially calculates the difference between each two adjacent maximum values D_MAX[j]−D_MAX[j+1], and detects two pairs of maximum and minimum values {D_MAX[i], MIN[i+1]} and {D_MAX[i+1], MIN[i+1]} having the largest difference D_MAX[j]−D_MAX[j+1] (step S32).

Thereafter, the threshold determining module 242 calculates the average of the minimum values MIN[i] and MIN[i+1] (=(MIN[i]+MIN[i+1])/2) and determines the result of calculation as the threshold WIth (step S33).

The series of operations then proceeds to step S3 in FIG. 14.

In this way, each of the radio devices receives a prescribed number of Hello packets (=30) from n (n is an integer of 5 or more) radio devices existing within one hop from itself and detects a pair of maximum and minimum values MAX[k] and MIN[k] of the reception signal strengths for each of then radio devices. Then, the radio devices each rearrange the detected n pairs of maximum and minimum values MAX[1] and MIN [L] to MAX[n] and MIN[n] so that then maximum values MAX[1] to MAX[n] are in descending order, detects two adjacent maximum values D_MAX[i] and D_MAX[i+1] having the largest difference among the rearranged n pairs of maximum and minimum values D_MAX[1] and D_MIN[1] to D_MAX[n] and D_MIN[n], and determines the average of two minimum values D_MIN[i] and D_MIN[i+1] corresponding to the detected two maximum values D_MAX[i] and D_MAX[i+1] as the threshold WIth.

If there are five or more radio devices adjacent to each radio device, the threshold WIth can stably be determined as described above, while if the number of radio devices adjacent to each radio device is less than five, it is difficult to stably determine the threshold WIth by the above-described method.

Therefore, if the number of radio devices adjacent to each radio device is less than five, the threshold WIth is determined by the following method. The case in which only the radio device 39 is adjacent to the radio device 36 will be described as an example.

The radio device 39 sequentially switches transmission power to P (P is an integer of 5 or more) transmission power values and transmits a prescribed number (m=30) of Hello packets for a prescribed period (one minute) at each transmission power value.

The signal strength measuring module 241 of the radio device 36 detects maximum and minimum values MAX[p] and MIN[p] of the reception signal strengths at each of the transmission power values based on the m reception signal strengths of the m Hello packets received at each of the transmission power values, and outputs the detected P pairs of maximum and minimum values MAX[1] and MIN[1]to MAX[P] and MIN[P] to the threshold determining module 242.

The threshold determining module 242 rearranges the P pairs of maximum and minimum values MAX[1] and MIN[1] to MAX[P] and MIN[P] so that the P maximum values MAX[ ] to MAX[P] are in descending order, and in the rearranged P pairs of maximum and minimum values D_MAX[1] and D_MIN[1] to D_MAX[P] and D_MIN[P], two adjacent maximum values D_MAX[i] and MAX[i+1] having the largest difference are detected. Then, the threshold determining module 242 determines the average of two minimum values D_MIN[i] and D_MIN[i+1] corresponding to the detected two maximum values D_MAX[i] and MAX[i+1] as the threshold WIth.

Figure 17:
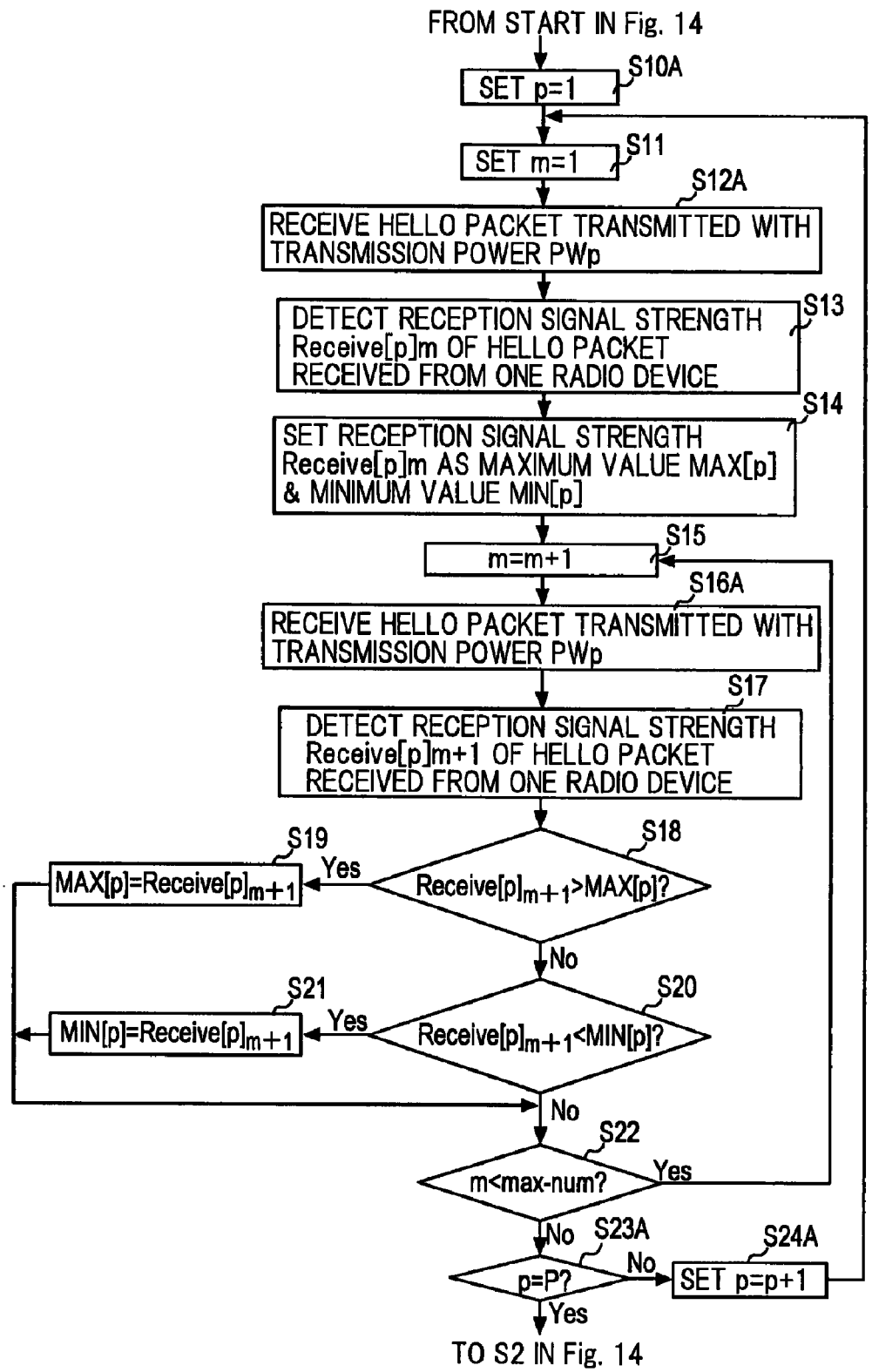
FIG. 17 is another flowchart for use in illustrating detailed operation in step S1 shown in FIG. 14.

FIG. 17 is another flowchart for use in illustrating detailed operation in step S1 in FIG. 14. The flowchart in FIG. 17 is substantially identical to the flowchart in FIG. 15 with the difference being that steps S0, S12, S16, S23, and S24 in the flowchart in FIG. 15 are replaced by steps S10A, S12A, S16A, S23A, and S24A, respectively.

After the start of the series of operations, the signal strength measuring module 241 sets p=1 (step S10A). Then, step S11 described above is carried out and then the signal strength measuring module 241 receives a Hello packet transmitted with transmission power value PWp (step S12A). Thereafter, steps S13 to S15 described above are carried out. In this case, Receive[k]m shown in steps S13 and S14 is replaced by Receive [p]m, and MAX[k] and MIN[k] shown in step S14 in FIG. 15 are replaced by MAX[p] and MIN[p], respectively.

After step S15, the signal strength measuring module 241 receives a Hello packet transmitted with transmission power PWp (step S16A). Then, steps S17 to S22 described above are carried out. In this case, Receive[k]m+1, MAX[k], and MIN [k] are replaced by Receive[p]m+1, MAX[p], and MIN[p], respectively.

If it is determined in step S22 that m has reached max_num, the signal strength measuring module 241 determines whether p=P (step S23A) and sets p=p+1 if p is not equal to P (step S24A), and then the series of operations proceeds to step S11.

Then, steps S1, S12A, S13 to S15, S16A, S17 to S22, S23A, and S24A described above are repeatedly carried out until it is determined in step S23A that p=P. More specifically, steps S1, S12A, S13 to S15, S16A, S17 to S22, S23A, and S24A described above are repeatedly carried out until the transmission power value PWp is changed into all of P values of the transmission power.

In this way, the P pairs of maximum and minimum values MAX[1] and MIN[1] to MAX[P] and MIN[P] are detected.

Then, if it is determined in step S23A that p=P, the series of operations proceeds to step S2 in FIG. 14 and the threshold WIth is determined based on the P pairs of maximum and minimum values MAX[1] and MIN[1] to MAX[P] and MIN [P] according to the flowchart in FIG. 16.

In this way, the radio devices each receive a prescribed number (m=30) of Hello packets in each transmission power PW from one radio device existing within one hop from itself while changing the transmission power PW to P power values and detects a pair of maximum and minimum values MAX [p] and MIN [p] of the reception signal strengths for each of the P parts of the transmission power PW. The radio devices each rearrange the detected P pairs of maximum and minimum values MAX[1] and MIN[L] to MAX[P] and MIN[P] so that the P maximum values MAX[1] to MAX[P] are in descending order, detects two adjacent maximum values D_MAX[i] and D_MAX[i+1] having the largest difference in the rearranged P pairs of maximum and minimum values D_MAX[1] and D_MIN[1] to D_MAX[P] and D_MIN[P]. Then, the average of the two minimum values D_MIN[i] and D_MIN [i+1] corresponding to the two detected maximum values D_MAX[i] and D_MAX[i+1] is determined as the threshold WIth.

As in the foregoing, according to the invention, using Hello packets regularly broadcast from the radio devices 31 to 43 of the radio network system 100, the maximum and minimum reception signal strengths MAX[k] and MIN[k] (or MAX[p] and MIN[p]) of the Hello packets received from the radio devices can be detected.

Therefore, each of the radio devices can receive only Hello packets transmitted/received in a stable radio wave environment through normal operation in the ad hoc network and can produce a stable routing table 21. Consequently, stable routing is enabled.

As described above, if the number of radio devices adjacent to each radio device is five or more, the pairs of maximum and minimum values MAX[k] and MIN[k] received from one radio device are detected for each of the five or more radio devices and the threshold WIth is determined based on the detected five or more pairs of minimum and maximum values MAX[k] and MIN[k]. If the number of radio devices adjacent to each radio device is less than five, the maximum and minimum values MAX [p] and MIN [p] of the reception signal strengths of Hello packets received from one radio device are detected for each of five or more transmission power values, and the threshold WIth is determined based on the detected five or more pairs of maximum and minimum values MAX[p] and MIN[p].

Therefore, according to the invention, the number of radio devices that transmit Hello packets is counted and the threshold WIth may be determined by one of the above two methods depending on the count result.

Figure 18:
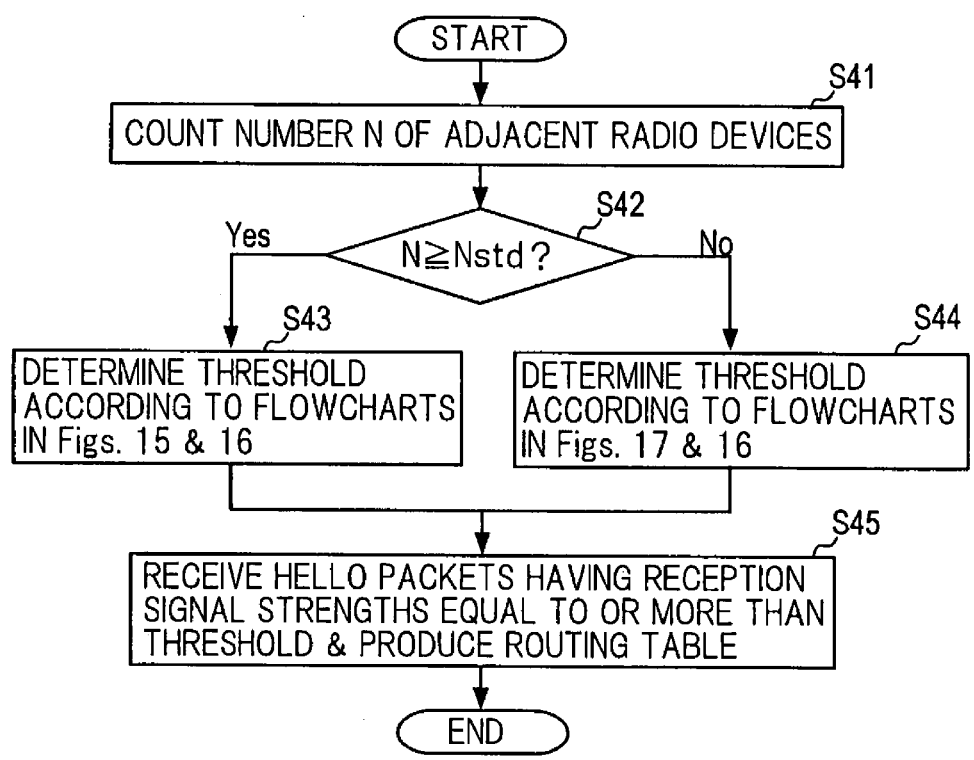
FIG. 18 is another flowchart for use in illustrating the operation of producing a routing table.

FIG. 18 is another flowchart for use in illustrating the operation of producing a routing table. After the start of the series of operations, the signal strength measuring module 241 of each of the radio devices 31 to 43 counts the number N (N is a positive integer) of adjacent radio devices based on the source addresses of broadcast Hello packets (step S41) and determines whether the counted number N is equal to or more than a standard value Nstd (such as five) (step S42).

If the number N of the adjacent radio devices is equal to or more than the standard value Nstd, the signal strength measuring module 241 detects n pairs of maximum and minimum values MAX[k] and MIN[k] according to the flowchart in FIG. 15 and outputs the detected n pairs of maximum and minimum values MAX[k] and MIN[k] to the threshold determining module 242.

The threshold determining module 242 determines a threshold WIth according to the flowchart shown in FIG. 16 based on then pairs of maximum and minimum values MAX [k] and MIN[k] received from the signal strength measuring module 241 and outputs the determined threshold WIth to the table producing module 243 (step S43).

If it is determined in step S42 that the number N of the adjacent radio devices is less than the standard value Nstd, the signal strength measuring module 241 detects P pairs of maximum and minimum values MAX[p] and MIN[p] according to the flowchart in FIG. 17 and outputs the detected P pairs of maximum and minimum values MAX[p] and MIN [p] to the threshold determining module 242.

The threshold determining module 242 determines a threshold WIth according to the flowchart in FIG. 16 based on the P pairs of maximum and minimum values MAX[p] and MIN[p] received from the signal strength measuring module 241 and outputs the determined threshold WIth to the table producing module 243 (step S44).

After step S43 or S44, the table producing module 243 receives Hello packets having reception signal strengths equal to or more than the threshold WIth received from the threshold determining module 242 and produces a routing table 21 according to the above-described method (step S45). In this way, the series of operations ends.

As in the foregoing, according to the flowchart in FIG. 18, regardless of the number of adjacent radio devices, a threshold WIth can be determined and a stable routing table 21 can be produced based on the determined threshold WIth. Consequently, stable routing can be carried out.

Figure 19:
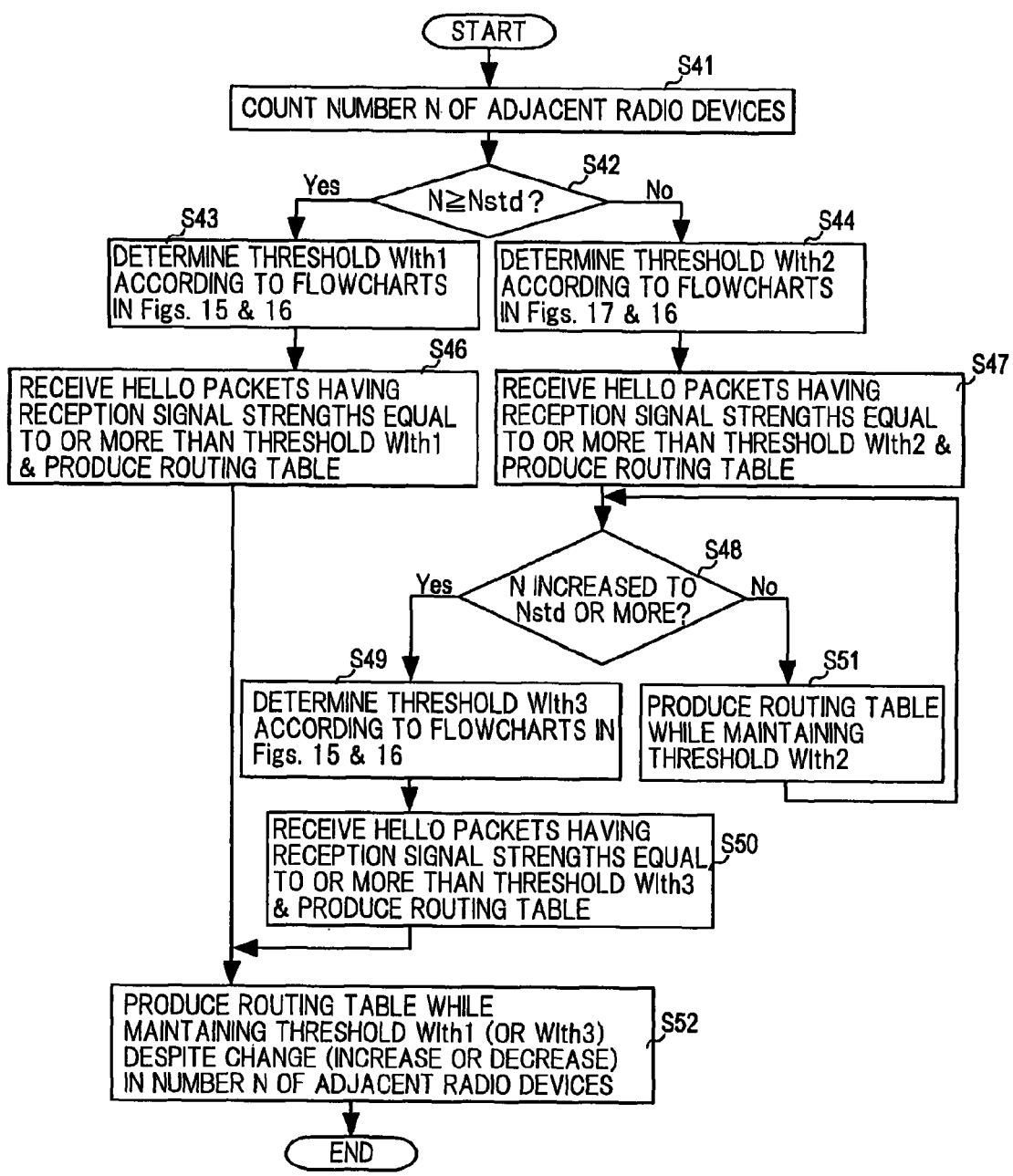
FIG. 19 is yet another flowchart for use in illustrating the operation of producing a routing table.

FIG. 19 is another flowchart for use in illustrating the operation of producing a routing table. According to the invention, the routing table 21 may be produced according to the flowchart shown in FIG. 19.

The flowchart in FIG. 19 is removed of step S45 in the flowchart in FIG. 18 and additionally provided with steps S46 to S52, and the other parts is the same as that in the flowchart in FIG. 18. Note that in the flowchart in FIG. 19, a threshold WIth1 is determined in step S43 and a threshold WIth2 is determined in step S44.

After step S43, the table producing module 243 in each of the radio devices 31 to 43 receives Hello packets having reception signal strengths equal to or more than the threshold WIth1 and produces a routing table 21 (step S46).

After step S44, the table producing module 243 in each of the radio devices 31 to 43 receives Hello packets having reception signal strengths equal to or more than the threshold WIth2 and produces a routing table 21 (step S47). The signal strength measuring module 241 in each of the radio devices 31 to 43 determines whether the number N of adjacent radio devices has increased to a number equal to or more than the standard value Nstd (step S48) and if the number N has increased to the standard value Nstd or more, n pairs of maximum and minimum values MAX[k] and MIN[k] are detected according to the flowchart in FIG. 15 and a threshold WIth3 is determined according to the flowchart in FIG. 16 based on the n pairs of maximum and minimum values MAX [k] and MIN[k] (step S49).

Thereafter, the table producing module 243 receives Hello packets having reception signal strengths equal to or more than the threshold WIth3 and produces a routing table 21 (step S50).

If it is determined in step S48 that the number N is yet to reach the standard value Nstd, the table producing module 243 maintains the threshold WIth2 and produces a routing table 21 (step S51). Then, the series of operations proceeds to step S48.

After step S46 or S50, the table producing module 243 in each of the radio devices 31 to 43 maintains the threshold WIth1 (or WIth3) even if the number N of adjacent radio devices changes (increases or decreases) and produces a routing table 21 (step S52). In this way, the series of operations ends.

In the flowchart in FIG. 19, as long as the number N of adjacent radio devices is equal to or more than the standard value Nstd, a routing table 21 is produced based on the initially determined threshold WIth1 even if the number N changes thereafter (see "Yes" in step S42, steps S43, S46, and S52), and if the number N of adjacent radio devices does not reach the standard value Nstd to start with, the transmission power is changed and the threshold WIth2 is determined (see "No" in step S42 and step S44). If the number N of adjacent radio devices increases to the standard value Nstd or more, the threshold WIth3 is determined again and the threshold WIth1 is updated by the determined threshold WIth3. Thereafter, the threshold WIth3 is maintained and a routing table 21 is produced (see steps S47 to S52).

More specifically, according to the invention, if the number N of adjacent radio devices increases to the standard value Nstd or more, the threshold WIth is updated and otherwise the threshold WIth is not updated.

Note that in the flowchart in FIG. 19, the threshold WIth may be updated if the number N of adjacent radio devices increased by a prescribed number. In this case, it is determined in step S48 in FIG. 19 whether the number N of adjacent radio devices has increased by the prescribed number and the other parts is the same as that in the flowchart in FIG. 19.

Figure 20:
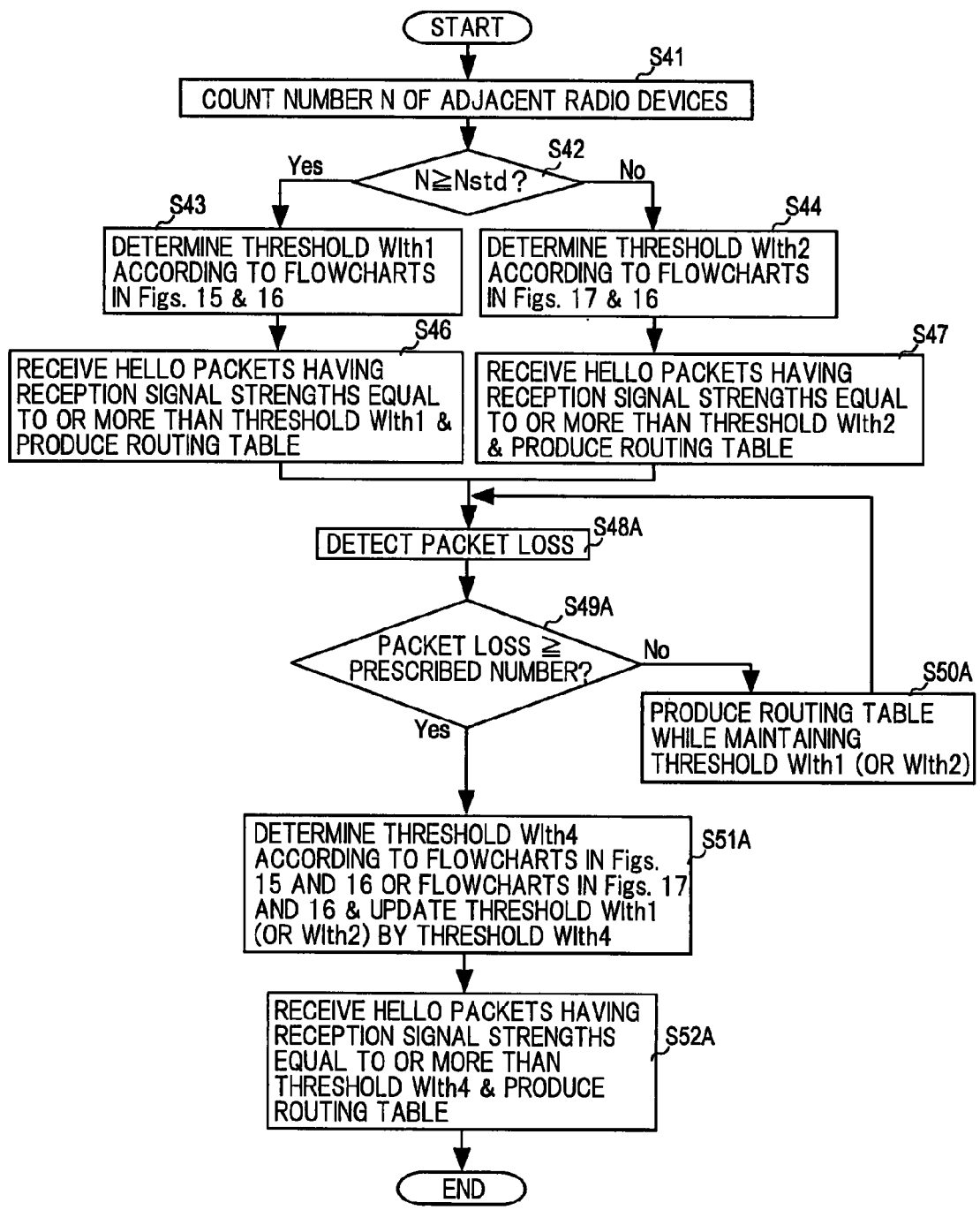
FIG. 20 is still another flowchart for use in illustrating the operation of producing a routing table.

FIG. 20 is another flowchart for use in illustrating the operation of producing a routing table. According to the invention, the routing table 21 may be produced according to the flowchart shown in FIG. 20.

The flowchart shown in FIG. 20 is identical to the flowchart in FIG. 19 with the difference being that steps S48 to S52 in the flowchart in FIG. 19 are replaced by steps S48A to S52A and the other parts is the same as that in the flowchart in FIG. 19.

After step S46 or S47, the signal strength measuring module 241 detects packet loss (step S48A). More specifically, the signal strength measuring module 241 detects packet loss using that a prescribed number of packets are not received within a prescribed period.

The signal strength measuring module 241 determines whether the detected packet loss is equal to or more than a prescribed number (step S49A). If the packet loss is less than the prescribed number, the table producing module 243 maintains the threshold WIth1 or WIth2 and produces a routing table 21 (step S50A). Thereafter, the series of operations proceeds to step S48A.

If it is determined in step S49A that the packet loss is equal to or more than the prescribed number, the signal strength measuring module 241 and the threshold determining module 242 determine a threshold WIth4 according to the flowcharts in FIGS. 15 and 16 or the flowcharts in FIGS. 17 and 16, and the threshold WIth1 or WIth2 is updated by the threshold WIth4 (step S51A).

Thereafter, the table producing module 243 receives Hello packets having reception signal strengths equal to or more than the threshold WIth4 and produces a routing table 21 (step S52A). In this way, the series of operations ends.

In the flowchart in FIG. 20, if the packet loss is equal to or more than the prescribed number, the threshold WIth is updated and otherwise the threshold WIth is not updated. If the packet loss is the prescribed number or more, it is highly likely that the radio wave environment is unstable, so that the threshold WIth is updated.

Figure 21:
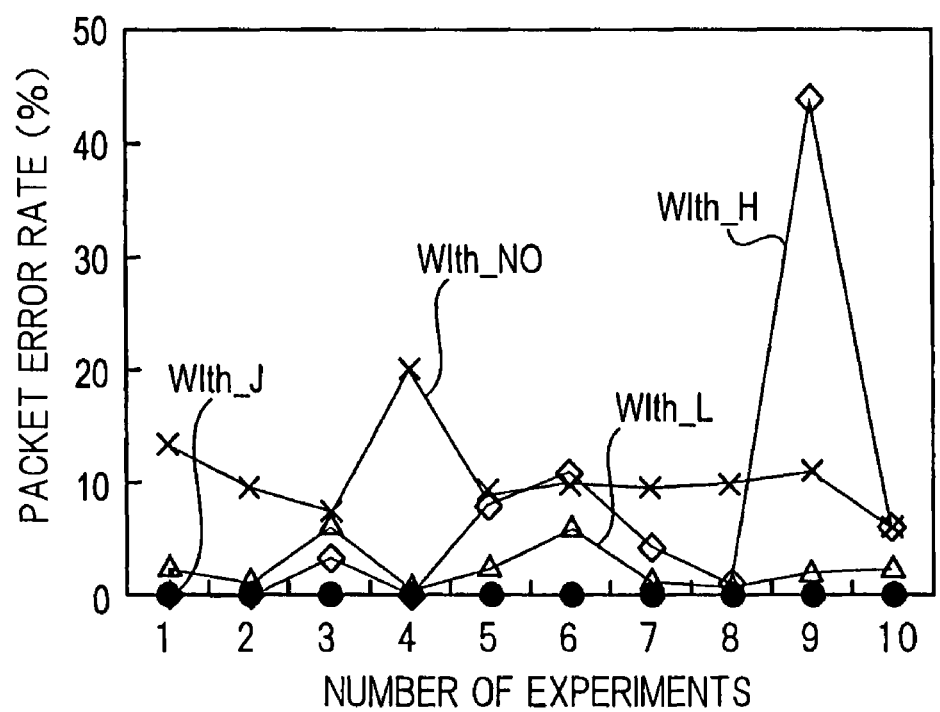
FIG. 21 shows the relation between the packet error rate and the number of experiments.

FIG. 21 shows the relation between the packet error rate and the number of experiments. In FIG. 21, the ordinate represents the packet error rate and the abscissa represents the number of experiments. The thresholds WIth_H, WIth_L, and WIth_J are denoted by WIth_H, WIth_L, and WIth_J in FIG. 10, the threshold WIth_H is a threshold that is too high, the threshold WIth_L is a threshold that is too low, and the threshold WIth_J is a threshold according to the invention. What is denoted by WIth_NO corresponds to the case in which no threshold was set.

As can be clearly understood from FIG. 21, when the threshold WIth_J determined according to the invention was used, the packet error rate continued to be zero until the tenth experiment. When however the threshold WIth was too high or too low and no threshold WIth was set, the packet error rate greatly changed with the number of experiments. More specifically, if the threshold WIth is too high or too low and no threshold WIth is set, the routing table 21 is frequently rewritten and loops occur in the radio network system 100, so that the arriving sequence of packets is greatly changed, and the packet error rate increases.

Therefore, it was established based on the experiments that a stable routing table 21 could be produced and stable routing could be carried out by determining the threshold WIth by the methods according to the invention.

In the foregoing description, the n pairs of maximum and minimum values MAX[1] and MIN[1] to MAX[n] and MIN [n] (or the P pairs of MAX[1] and MIN[1] to MAX[P] and MIN[P]) are rearranged so that the n maximum values MAX [1] to MAX[n] (or the P maximum values MAX[1] to MAX [P]) are arranged in descending order, while the invention is not limited to the arrangement. The n pairs of maximum and minimum values MAX[1] and MIN[L] to MAX[n] and MIN [n] (or the P pairs of maximum and minimum values MAX[1] and MIN[1] to MAX[P] and MIN[P]) may be rearranged so that n maximum values MAX[1] to MAX[n] (or the P maximum values MAX[1] to MAX[P]) are arranged in ascending order, and two pairs of maximum and minimum values D_MAX[i] and D_MIN[i]; D_MAX[i+1] and D_MIN[i+1] in which the two adjacent maximum values have the largest difference are detected among the rearranged n pairs of maximum and minimum values D_MAX[1] and D_MIN[1] to D_MAX [n] and D_MIN[n], and the average of the two minimum values D_MIN[i] and D_MIN[i+1] included in the detected two pairs of maximum and minimum values D_MAX[i] and D_MIN[i]; (D_MAX[i+1] and D_MIN[i+1], in other words, ((D_MIN [i]+D_MIN [i+1])/2) may be determined as the threshold WIth.

In the foregoing description, the average of the two minimum values D_MIN[i] and D_MIN[i+1], in other words, ((D_MIN[i]+D_MIN[i+1])/2) is determined as the threshold WIth, while the invention is not limited to the arrangement, and a weighted average of the two minimum values D_MIN [i] and D_MIN[i+1] may be determined as the threshold WIth.

In this case, the weighted average is calculated by following expression.

$$(\alpha \times (D\_MIN[i]) + (1-\alpha) \times (D\_MIN[i+1]))/2 \quad (1)$$

where $\alpha$ is a real number in the range represented by $0<\alpha<1$.

When the n maximum values D_MAX[1] to D_MAX[n] or the P maximum values D_MAX[1] to D_MAX[P] are arranged in descending order, $\alpha$ is set to relatively larger values as the difference between the D_MIN[i] and D_MIN [i+1] (=D_MIN[i]–D_MIN[i+1]) relatively increases, and set to relatively smaller values as the difference (=D_MIN[i]–D_MIN[i+1]) relatively decreases.

When the difference (=D_MIN[i]–D_MIN[i+1]) relatively increases, there is a possibility that the minimum value D_MAX[i+1] is smaller than the minimum values of the reception signal strengths in an unstable radio wave environment (the minimum values on the right of MIN[15] in FIG. 10), and if the average ((D_MIN[i]+D_MIN[i+1])/2) is determined as the threshold WIth, a routing table 21 might be produced using Hello packets transmitted/received in an unstable radio wave environment. Therefore, the weighted average is introduced in order to detect only a reception signal strength in a stable radio wave environment and set a reception signal strength closer to the minimum value D_MIN[i] as the threshold WIth.

When the n maximum values D_MAX[1] to D_MAX[n] or the P maximum values D_MAX[1] to D_MAX[P] are arranged in ascending order, $\alpha$ is set to relatively larger values as the difference between the D_MIN[i+1] and D_MIN[i] (=D_MIN[i+1]–D_MIN[i]) relatively increases, and set to relatively smaller values as the difference (=D_MIN[i+1]–D_MIN[i]) relatively decreases.

The weighted average is introduced for the same reason as the above.

In the foregoing description, the threshold WIth is determined based on the average of the two minimum values D_MIN[i] and D_MIN[i+1] (=(D_MIN[i]+D_MIN[i+1])/2) or the weighted average of the two minimum values D_MIN [i] and D_MIN[i+1] (see Expression (1)), but the invention is not limited to the arrangement and the threshold WIth may be determined to be included in the range defined as having the two minimum values D_MIN[i] and D_MIN[i+1] as end values.

Furthermore, in the foregoing description, the number of adjacent radio devices used to determine the threshold WIth with higher reliability is five, but the invention is not limited to the arrangement, and the number of adjacent radio devices used to determine the threshold WIth with higher reliability may be other than five and determined depending on surrounding radio wave environments.

Note that according to the first embodiment of the invention, the signal strength measuring module 241 and the threshold determining module 242 form the "threshold determining means."

The table producing module 243 forms the "table producing means."

The signal strength measuring module 241 forms the "signal strength detecting means."

The threshold determining module 242 that rearranges the n pairs of maximum and minimum values MAX[1] and MIN [1] to MAX[n] and MIN[n] into the n pairs of maximum and minimum values D_MAX[1] and D_MIN[1] to D_MAX[n] and D_MIN[n] or the P pairs of maximum and minimum values MAX[1] and MIN[1] to MAX[P] and MIN[P] into the P pairs of maximum and minimum values D_MAX[L] and D_MIN[1] to D_MAX[P] and D_MIN[P] forms the "rearranging means."

The threshold determining module 242 that determines the threshold WIth based on the n pairs of maximum and minimum values D_MAX[1] and D_MIN[1] to D_MAX[n] and D_MIN[n] or the P pairs of maximum and minimum values D_MAX[1] and D_MIN[1] to D_MAX[P] and D_MIN[P] forms the "setting means."

Second Embodiment

Figure 22:
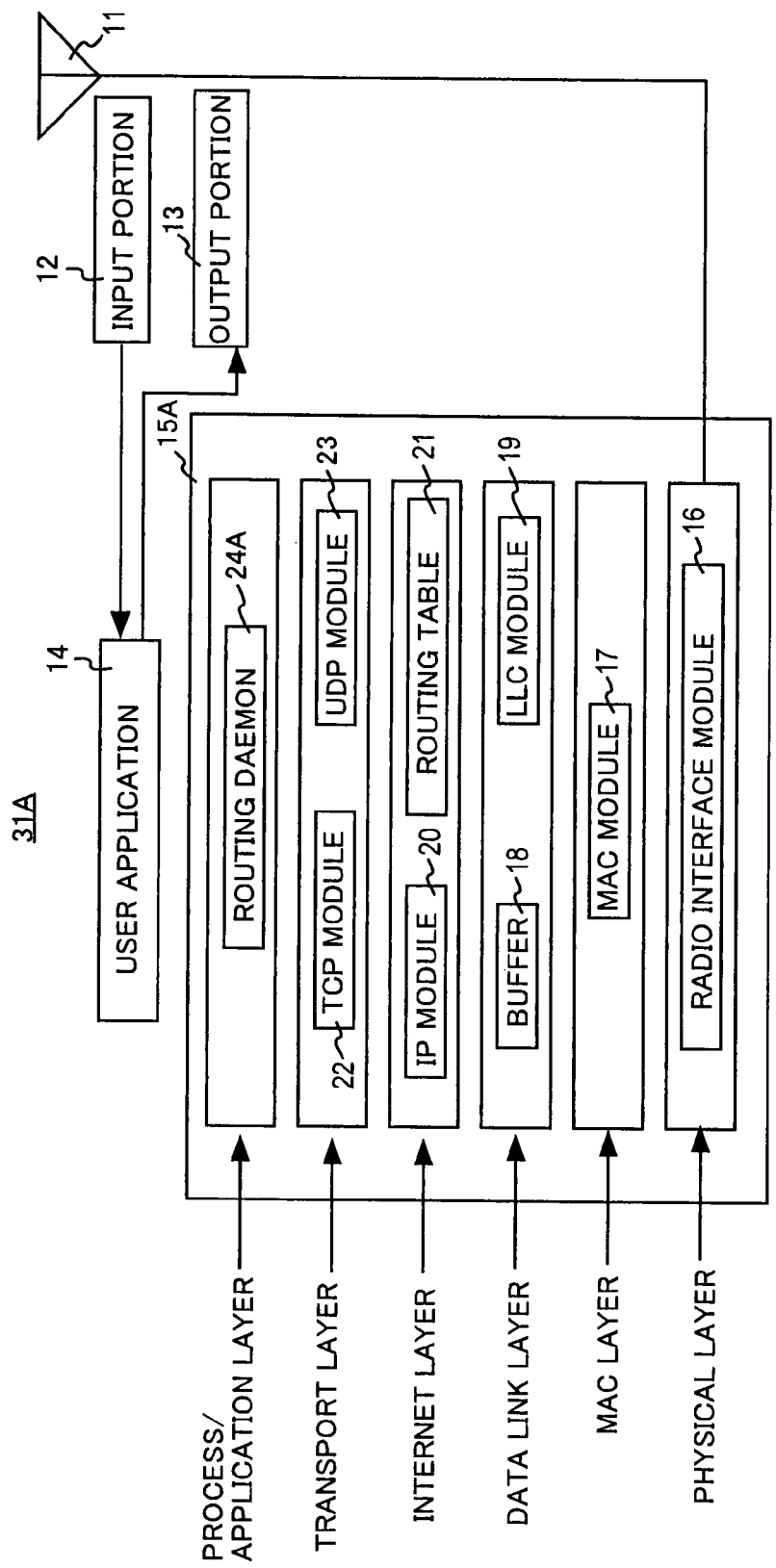
FIG. 22 is a schematic block diagram of a configuration of the radio device shown in FIG. 1 according to a second embodiment of the invention.

FIG. 22 is a schematic block diagram showing a configuration of the radio device 31 in FIG. 1 according to a second embodiment of the invention. The radio device 31A includes a communication control unit 15A in place of the communication control unit 15 of the radio device 31 in FIG. 2 and the other parts is the same as that of the radio device 31.

The communication control unit 15A includes a routing daemon 24A in place of the routing daemon 24 of the communication control unit 15 shown in FIG. 2 and the other parts is the same as that of the communication control unit 15.

The routing daemon 24A determines a threshold WIth_HH used to register a radio device that has transmitted a Hello packet as an adjacent radio device in a neighbor list and a threshold WIth_LL used to remove a radio device that has transmitted a Hello packet from the neighbor list according to a method that will be described. The routing daemon 24A registers a radio device that has transmitted a Hello packet whose reception signal strength is equal to or more than the threshold WIth_HH to the neighbor list, removes a radio device that has transmitted a Hello packet whose reception signal strength is less than the threshold WIth_LL from the neighbor list based on the determined thresholds WIth_HH and WIth_LL, and dynamically produces a routing table 21 in the Internet layer. The routing daemon 24A carries out the same function as the routing daemon 24 except for this function.

Figure 23:
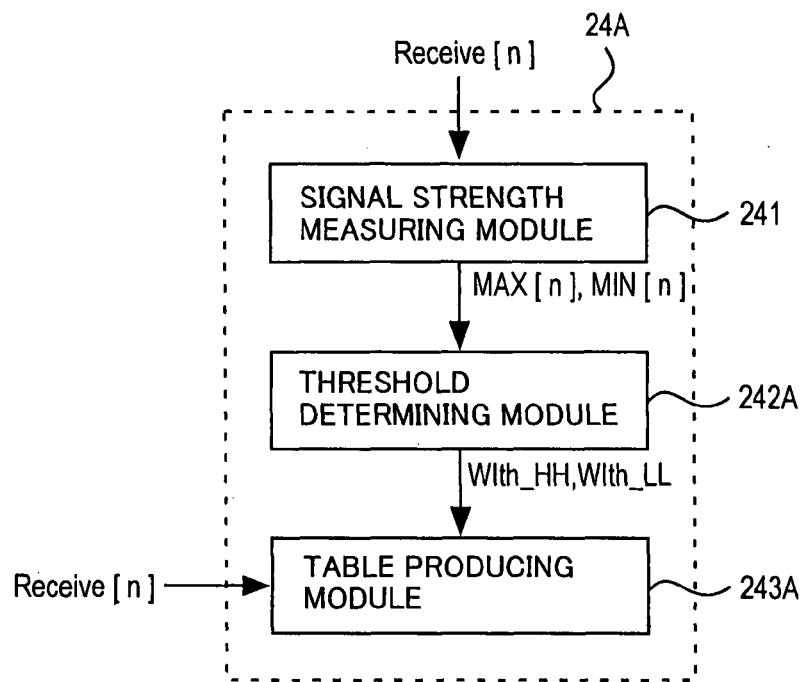
FIG. 23 is a functional block diagram of the routing daemon shown in FIG. 22.

FIG. 23 is a functional block diagram of the routing daemon 24A shown in FIG. 22. The routing daemon 24A includes a threshold determining module 242A and a table producing module 243A in place of the threshold determining module 242 and the table producing module 243 shown in FIG. 7, and the other parts is the same as the routing daemon 24.

The threshold determining module 242A determines the thresholds WIth_HH and WIth_LL based on m pairs of maximum and minimum values MAX[n] and MIN[n] received from the signal strength measuring module 241 according to a method that will be described and outputs the determined thresholds WIth_HH and WIth_LL to the table producing module 243A.

Upon receiving the thresholds WIth_HH and WIth_LL from the threshold determining module 242A, the table producing module 243A compares the reception signal strengths Receive[n] of Hello packets received from the radio interface module 16 to the threshold WIth_HH, extracts Hello packets having a reception signal strength Receive [n] equal to or more than the threshold WIth_HH, and produces a routing table 21 based on the extracted Hello packets.

The table producing module 243A compares the reception signal strengths Receive [n] of Hello packets received from the radio interface module 16 to the threshold WIth_LL, removes a radio device that has transmitted a Hello packet having a reception signal strength Receive [n] less than the threshold WIth_LL from the neighbor list, and updates the routing table 21.

Figure 24:
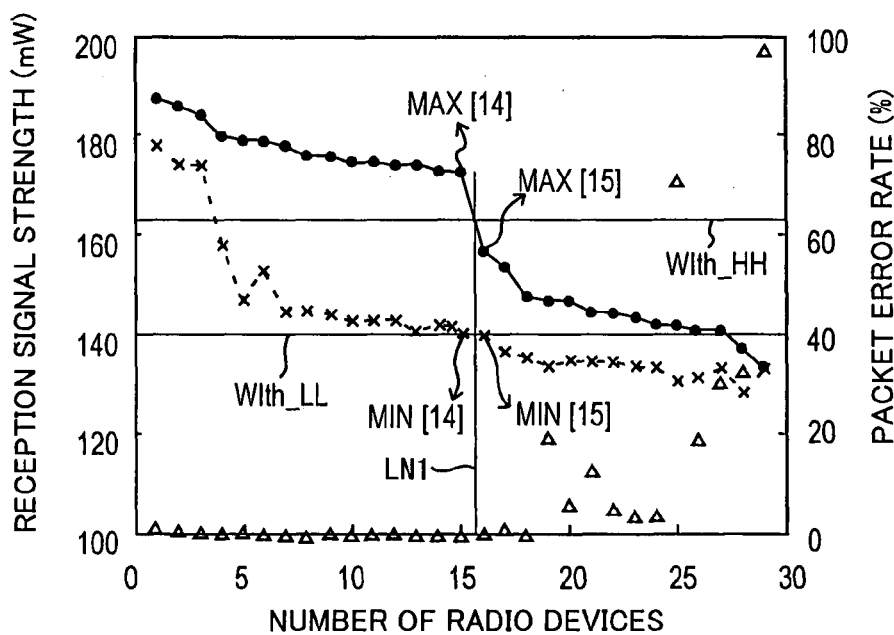
FIG. 24 is a graph for use in illustrating a method of determining thresholds according to the second embodiment.

FIG. 24 is a diagram for use in illustrating a method of determining the thresholds WIth_HH and WIth_LL according to the second embodiment. FIG. 24 shows the dependence of the reception signal strength and the packet error rate on the number of radio devices similarly to FIG. 10.

Upon receiving m pairs of maximum and minimum values MAX[n] and MIN[n] from the signal strength measuring module 241, the threshold determining module 242A rearranges the m pairs of maximum and minimum values MAX[n] and MIN[n] into m pairs of maximum and minimum values D_MAX [n] and D_MIN[n] so that the m maximum values MAX [n] are in descending order or ascending order by the same method as that in the rearrangement by the threshold determining module 242.

The rearranged m pairs of maximum and minimum values D_MAX[n] and D_MIN[n] are plotted with respect to the number of radio devices as • and x in FIG. 24.

In this way, the threshold determining module 242A detects two adjacent pairs of maximum and minimum values {D_MAX[i], D_MIN[i]} and {D_MAX[i+1], D_MIN[i+1]} of which the difference between the maximum values is the largest. Then, the average Dave1 (=(D_MAX[i]+D_MAX[i+1])/2) of the two maximum values D_MAX[i] and D_MAX [i+1] included in the detected two pairs of maximum and minimum values {D_MAX[i], D_MIN[i]} and {D_MAX[i+1], D_MIN[i+1]} is determined as the threshold WIth_HH, and the average Dave2 (=(D_MIN[i]+D_MIN[i+1])/2) of the two minimum values D_MIN[i] and D_MIN[i+1] included in the detected two pairs of maximum and minimum values {D_MAX[i], D_MIN[i]} and {D_MAX[i+1], D_MIN[i+1]} is determined as the threshold WIth_LL.

In this case, the average Dave1 (=(D_MAX[i]+D_MAX[i+1])/2) and the average Dave2 (=(D_MIN[i]+D_MIN[i+1])/2) are obtained with respect to the same number of radio devices. More specifically, the number of radio devices when the maximum value of the reception signal strengths equals the average value Dave1 (=(D_MAX[i]+D_MAX[i+1])/2) is the same as that of radio devices when the minimum value of the reception signal strengths equals the average Dave2 (=(D_MIN[i]+D_MIN[i+1])/2).

Consequently, the average Dave1 (=(D_MAX[i]+D_MAX[i+1])/2) corresponds to the average value Dave2 (=(D_MIN[i]+D_MIN[i+1])/2).

Therefore, when the threshold determining module 242A determines the thresholds WIth_LL and WIth_HH, it may determine the threshold WIth_HH according to the above-described method and determine as the threshold WIth_LL the minimum value of the reception signal strength at a crossing point of a line drawn vertically downwardly from the determined WIth_HH in FIG. 24 and the line of minimum values of reception signal strengths plotted with respect to the number of the radio devices.

When the threshold determining module 242A determines the thresholds WIth_LL and WIth_HH, it may determine the threshold WIth_LL according to the above-described method and then may determine as the threshold WIth_HH the maximum value of reception signal strength at the crossing point of a line drawn vertically upwardly from the determined threshold WIth_LL in FIG. 24 and the line of maximum values of the reception signal strengths plotted with respect to the number of radio devices.

Figure 25:
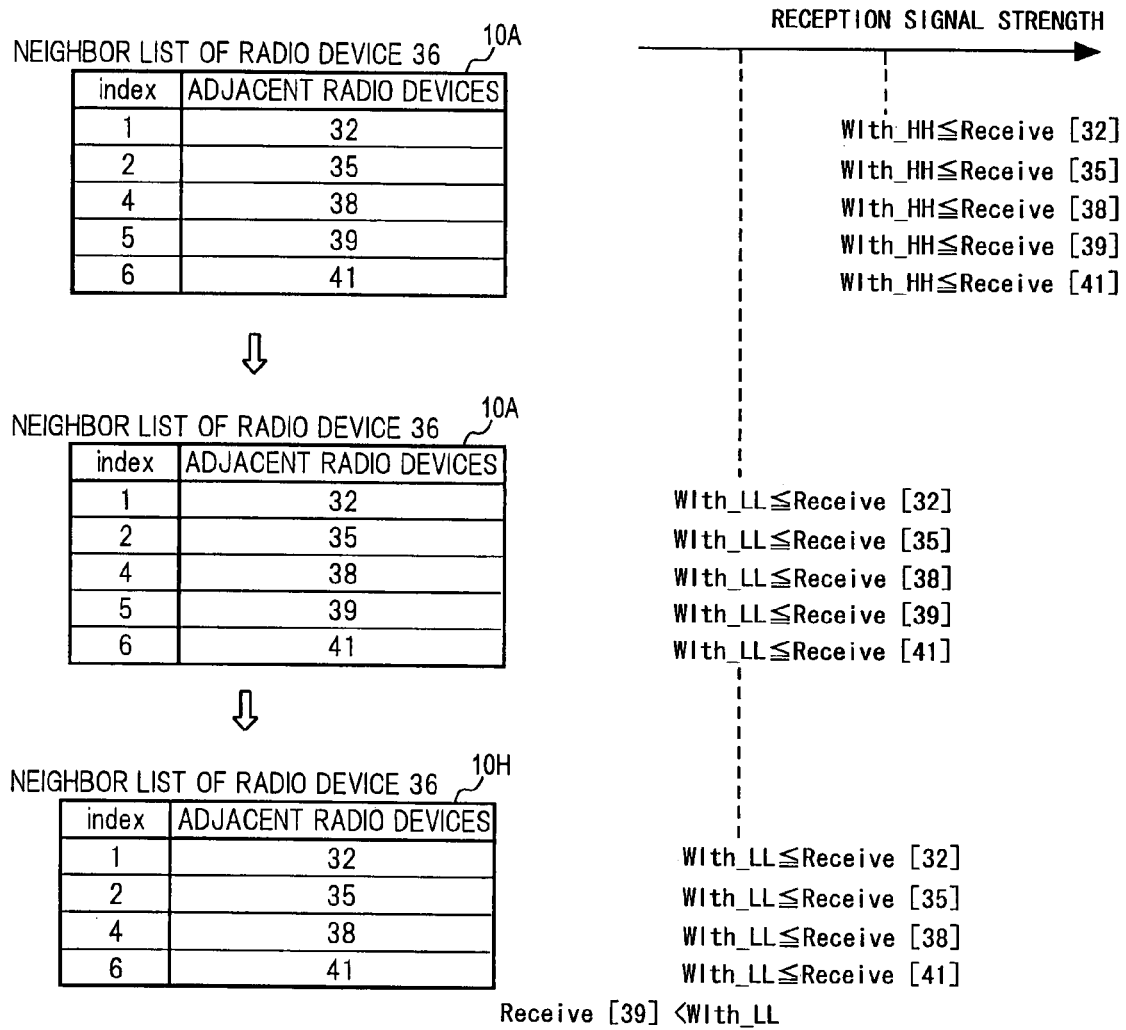
FIG. 25 shows how a neighbor list is updated using two thresholds.
Figure 26:
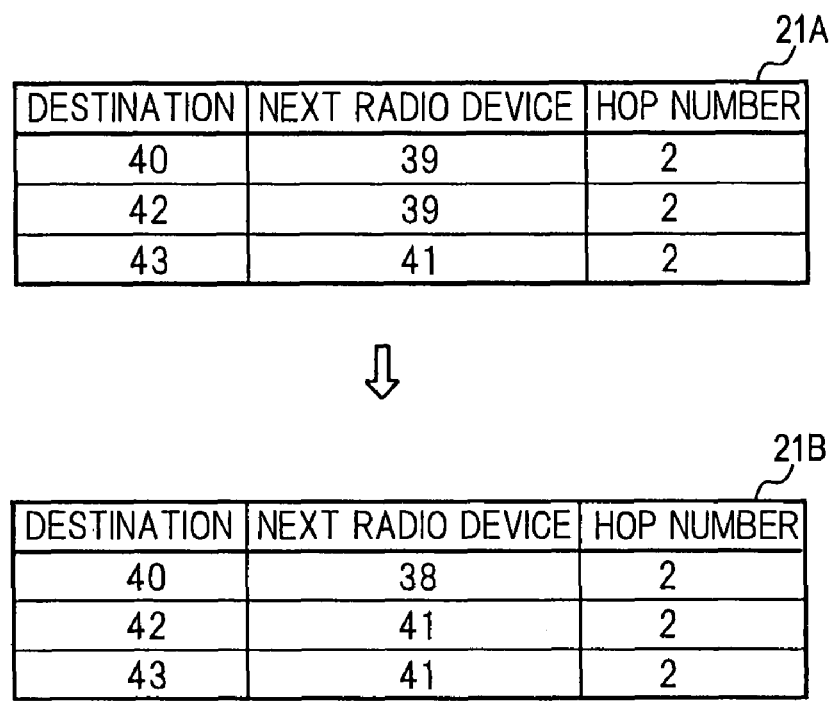
FIG. 26 shows how a routing table is updated using two thresholds.

FIG. 25 shows how a neighbor list is updated using the two thresholds WIth_HH and WIth_LL. FIG. 26 shows how the routing table 21 is updated using the two thresholds WIth_HH and WIth_LL.

As shown in FIG. 1, the radio devices 32, 35, 37, 38, 39, and 41 are adjacent to the radio device 36, the reception signal strengths of Hello packets received from the radio devices 32, 35, 38, 39, and 41 are not less than WIth_HH, and the reception signal strength of a Hello packet received from the radio device 37 is less than the threshold WIth_HH. Therefore, the table producing module 243A of the routing daemon 24A in the radio device 36 produces a neighbor list 10A based on the Hello packets from the radio devices 32, 35, 38, 39, and 41 (see FIG. 25).

In the radio device 36, the table producing module 243A of the routing daemon 24A produces a routing table 21A according to the method described in connection with the first embodiment (see FIG. 26).

Thereafter, in the radio device 36, the table producing module 243A of the routing daemon 24A maintains the neighbor list 10A if the reception signal strengths of Hello packet received from the radio devices 32, 35, 38, 39, and 41 are less than the threshold WIth_HH and not less than the threshold WIth_LL (see FIG. 25).

The table producing module 243A of the radio device 36 removes the radio device 39 to update the neighbor list 10A into a neighbor list 10H (see FIG. 25) if the reception signal strength of a Hello packet received from the radio device 39 is less than the threshold WIth_LL and updates the routing table 21A into a routing table 21B based on the updated neighbor list 10H and the neighbor list 10G (see FIG. 26).

In this case, the table producing module 243A of the radio device 36 can detect the radio device 38 as an adjacent device to the radio device 36 with reference to the neighbor list 10H and the radio device 41 as an adjacent device to the radio device 38 with reference to the neighbor list 10G. Therefore, the table producing module 243A of the radio device 36 changes the next radio device in the route to the radio device 40 as the destination from the radio device 39 to the radio device 38.

The table producing module 243A of the radio device 36 can detect the radio device 41 as an adjacent device to the radio device 36 with reference to the neighbor list 10H and the radio device 42 as an adjacent device to the radio device 41 with reference to the neighbor list 10G. Therefore, the table producing module 243A of the radio device 36 changes the next radio device in the route to the radio device 42 as the destination from the radio device 39 to the radio device 41. In this way, table producing module 243A of the radio device 36 updates the routing table 21A to a routing table 21B.

As described above, since the threshold WIth_HH used for registration in the neighbor list 10 and the threshold WIth_LL used for removal from the neighbor list 10 are introduced, a radio device registered in the neighbor list 10 because the reception signal strength is not less than the threshold WIth_HH is not removed from the neighbor list 10 until the reception signal strength become less than the threshold WIth_LL, so that frequent route switching in the routing table 21 can be avoided.

In FIG. 24, radio devices having reception signal strengths equal to or more than the threshold WIth_HH exist on the left of line LN1 and radio devices having reception signal strengths less than the threshold WIth_LL exist on the right of line LN1. More specifically, the two thresholds WIth_HH and WIth_LL are introduced, so that radio device whose adjacent radio devices are registered in the neighbor list 10 and radio devices whose adjacent radio devices are not registered in the neighbor list 10 can be separated.

During the period in which a radio device that has transmitted a Hello packet having a reception signal strength equal to or more than the threshold WIth_HH is registered in the neighbor list 10 and during the period in which a radio device that has transmitted a Hello packet having a reception signal strength lower than the threshold WIth_LL is removed from the neighbor list 10, the radio wave environment does not change for example by the use of a shielding element made of a metal plate provided between the two radio devices.

Therefore, the two thresholds WIth_HH and WIth_LL are introduced, so that a radio device whose adjacent radio devices are registered in the neighbor list 10 and a radio device whose adjacent radio devices are not registered in the neighbor list 10 can be separated for a period.

Consequently, once registered in the neighbor list 10, the radio device is not removed from the neighbor list 10 for the period and therefore frequent route switching in the routing table 21 can surely be reduced.

Figure 27:
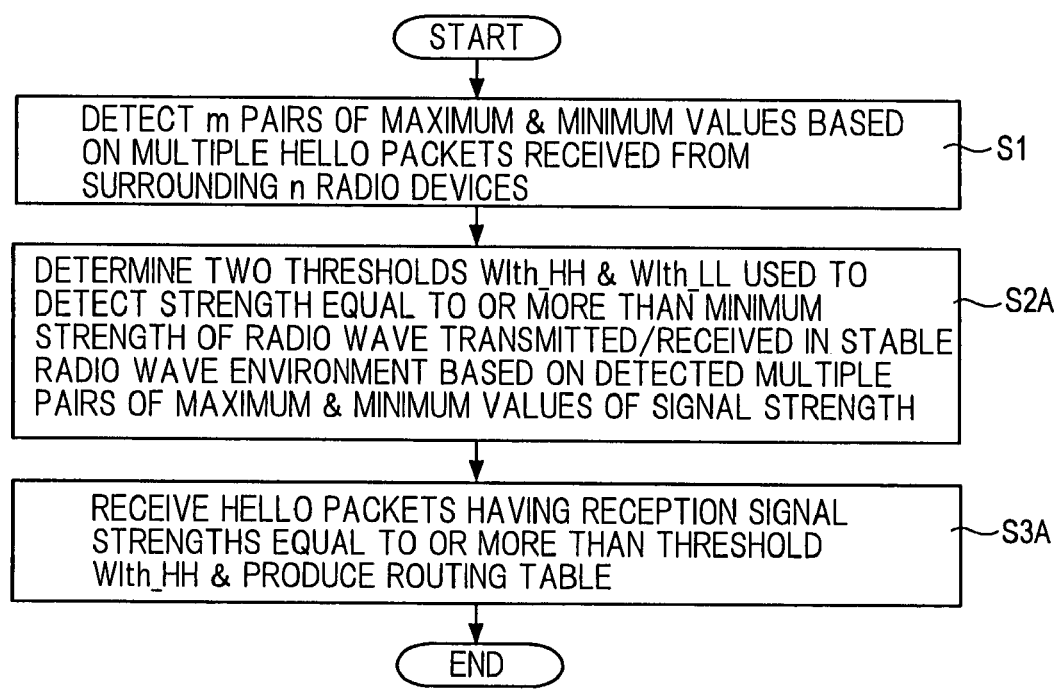
FIG. 27 is a flowchart for use in illustrating the operation of producing a routing table according to the second embodiment.

FIG. 27 is a flowchart for use in illustrating the operation of producing a routing table according to the second embodiment. The flowchart shown in FIG. 27 includes steps S2A and S3A in place of steps S2 and S3 in the flowchart in FIG. 14, and the other parts is the same as the flowchart in FIG. 14.

After step S1 described above, the threshold determining module 242A determines two thresholds WIth_HH and WIth_LL used to detect reception signal strengths equal to or more than the minimum strength of a radio wave transmitted/received in a stable radio wave environment according to the above-described method based on m pairs of maximum and minimum values received from the signal strength measuring module 241 (step S2A).

The threshold determining module 242A outputs the determined thresholds WIth_HH and WIth_LL to the table producing module 243A.

Thereafter, the table producing module 243A receives the two thresholds WIth_HH and WIth_LL from the threshold determining module 242A, receives Hello packets having reception signal strengths equal to or more than the received threshold WIth_HH, and produces a routing table 21 according to the above-described method (step S3A). Then, the series of operations steps ends.

Figure 28:
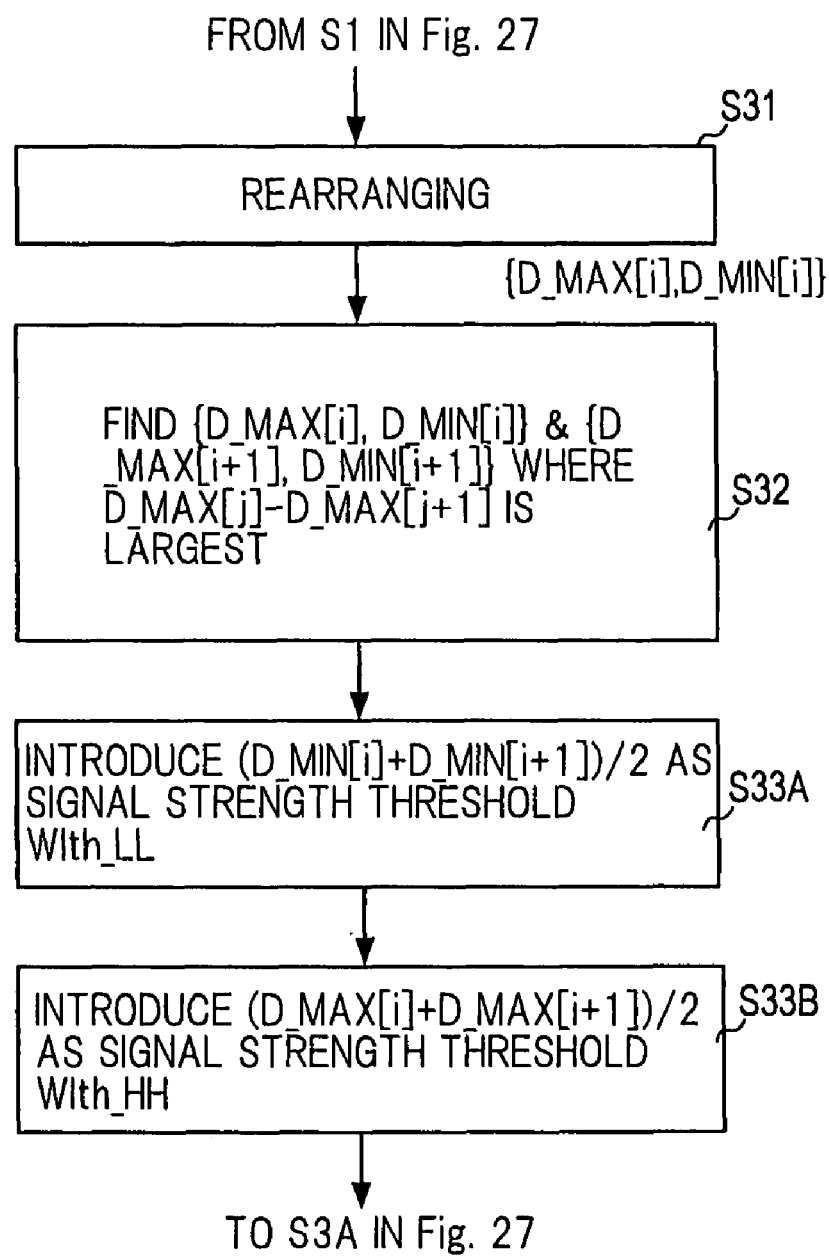
FIG. 28 is a flowchart for use in illustrating detailed operation in step S2A in FIG. 27.

FIG. 28 is a flowchart for use in illustrating detailed operation in step S2A in FIG. 27. After the start of the series of operations, the threshold determining module 242A rearranges n pairs of maximum and minimum values MAX[1] and MIN[1] to MAX[n] and MIN[n] into n pairs of maximum and minimum values D_MAX[1] and D_MAX[1] to D_MIN [n] and D_MIN[n] by the method carried out by the threshold determining module 242 according to the first embodiment (step S31).

The threshold determining module 242A sequentially calculates the difference between two adjacent maximum values D_MAX[j]−D_MAX[j+1] and detects two pairs of maximum and minimum values {D_MAX[i], MIN[i]} and {D_MAX[i+1], MIN[i+1]} having the largest difference D_MAX[j]−D_MAX[j+1](step S32).

Thereafter, the threshold determining module 242A calculates the average (=(MIN[i]+MIN[i+1])/2) of the minimum values MIN[i] and MIN[i+1] and determines the result of calculation as the threshold WIth_LL (step S33A). The threshold determining module 242A calculates the average (=(MAX[i]+MAX[i+1])/2) of maximum values MAX[i] and MAX[i+1] and determines the result of calculation as the threshold WIth_HH (step S33B).

The series of operations then proceeds to step S3A in FIG. 27.

Note that according to the second embodiment, the threshold determining module 242A may determine the two thresholds WIth_HH and WIth_LL according to the following method.

Figure 29:
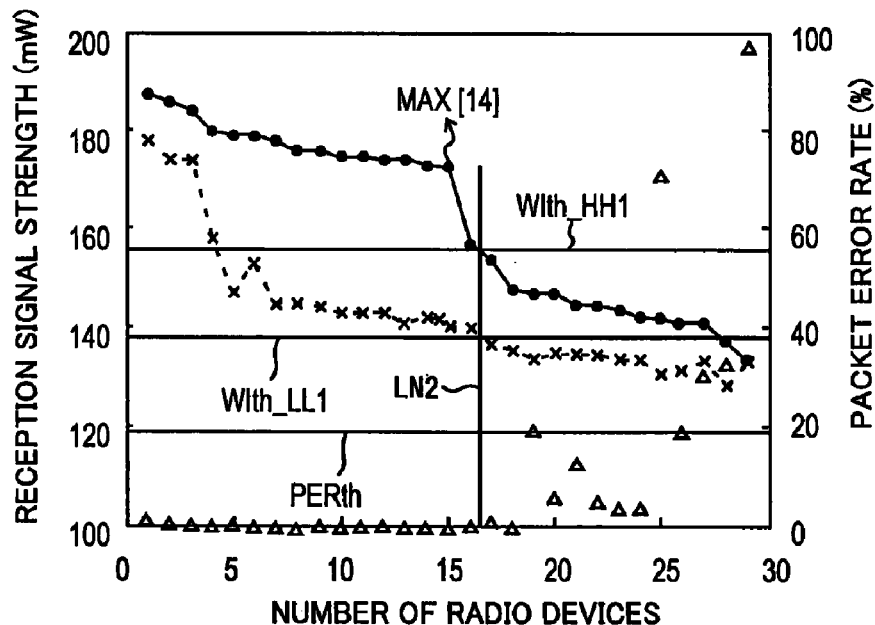
FIG. 29 is another graph for use in illustrating a method of determining thresholds according to the second embodiment.

FIG. 29 is a graph for use in illustrating the method of determining the thresholds according to the second embodiment. FIG. 29 shows the dependence of the reception signal strength and the packet error rate on the number of radio devices similarly to FIG. 10.

Upon receiving the m pairs of maximum and minimum values MAX[n] and MIN[n] from the signal strength measuring module 241, the threshold determining module 242A rearranges the m pairs of maximum and minimum values MAX[n] and MIN[n] according to the same method as that carried out by the threshold determining module 242 into m pairs of maximum and minimum values D_MAX[n] and D_MIN[n] so that the m maximum values MAX [n] are in descending or ascending order.

The rearranged m pairs of maximum and minimum values D_MAX[n] and D_MIN[n] plotted with respect to the number of radio devices are denoted by • and x in FIG. 29. The packet error rate plotted with respect to the number of radio devices is denoted by Δ in FIG. 29.

In this way, the threshold determining module 242A determines a threshold PERth for the packet error rate and determines a value higher than the determined threshold PERth by a prescribed value (=such as 5 dB) as a threshold WIth_LL1. The threshold determining module 242A then determines as a threshold WIth_HH1 the maximum value of the reception signal strength at a crossing point of line LN2 drawn vertically upwardly from the determined threshold WIth_LL1 and the line of maximum values of the reception signal strengths plotted with respect to the number of radio devices. The thresholds WIth_HH1 and WIth_LL1 determined according to the above-described method are obtained for the same number of radio devices. More specifically, the number of radio devices when the maximum value for the reception signal strength reaches the threshold WIth_HH1 is the same as the number of radio devices when the minimum value of the reception signal strength reaches the threshold WIth_LL1.

As a result, the threshold WIth_HH1 is a value corresponding to the threshold WIth_LL1.

The table producing module 243A registers a radio device that has transmitted a Hello packet having a reception signal strength equal to or more than the threshold WIth_HH1 in the neighbor list 10 and removes a radio device that has transmitted a Hello packet having a reception signal strength less than the threshold WIth_LL1 from the neighbor list 10, so that radio devices having their adjacent radio devices registered in the neighbor list 10 (radio devices existing on the left of line LN2 in FIG. 29) and radio devices removed from the neighbor list 10 (radio devices existing on the right of line LN2 in FIG. 29) can be separated for a period. Consequently, once registered in the neighbor list 10, a radio device is not removed from the neighbor list 10 for the period, so that frequent route switching in the routing table 21 can surely be reduced.

Figure 30:
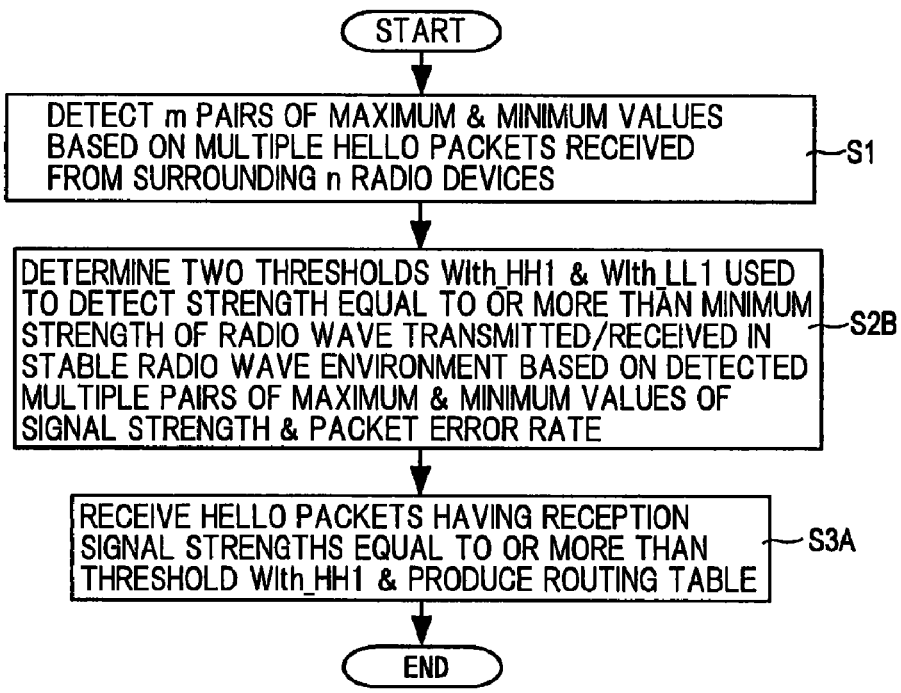
FIG. 30 is another flowchart for use in illustrating the operation of producing a routing table according to the second embodiment.

FIG. 30 is another flowchart for use in illustrating the operation of producing a routing table according to the second embodiment. The flowchart in FIG. 30 includes step S2B in place of step S2A in the flowchart in FIG. 27 and the other parts is the same as the flowchart in FIG. 27.

After step S1 described above, the threshold determining module 242A determines two thresholds WIth_HH1 and wIth_LL1 used to detect strengths equal to or more than the minimum strength of radio waves transmitted and received in a stable radio wave environment based on a plurality of pairs of maximum and minimum values of the detected signal strengths and the packet error rate (step S2B). Thereafter, step S3A described above is carried out and the series of operations ends.

Figure 31:
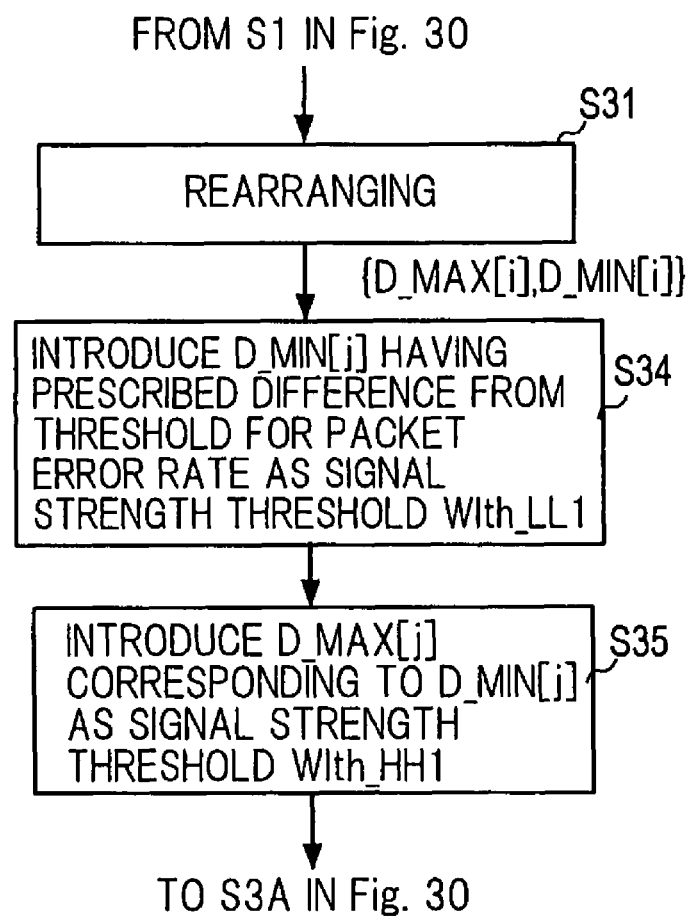
FIG. 31 is a flowchart for use in illustrating detailed operation in step S2B in FIG. 30.
Figure 32A:
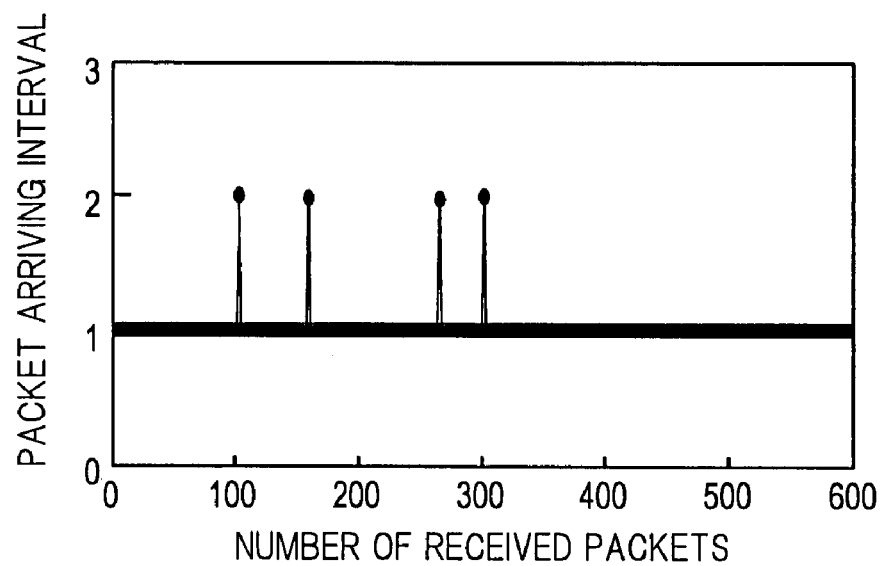
FIG. 32A is a first graph showing the relation between the packet arrival interval and the number of received packets.
Figure 32B:
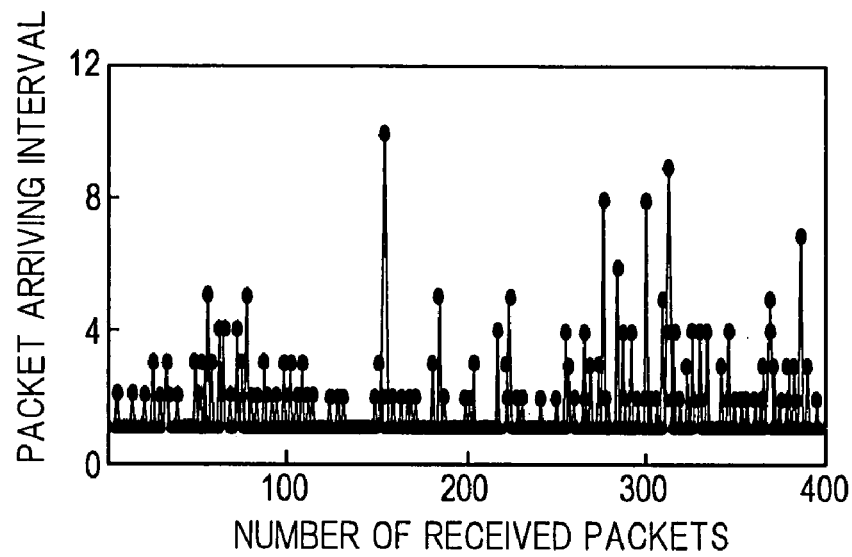
FIG. 32B is a second graph showing the relation between the packet arrival interval and the number of received packets.
Figure 33:
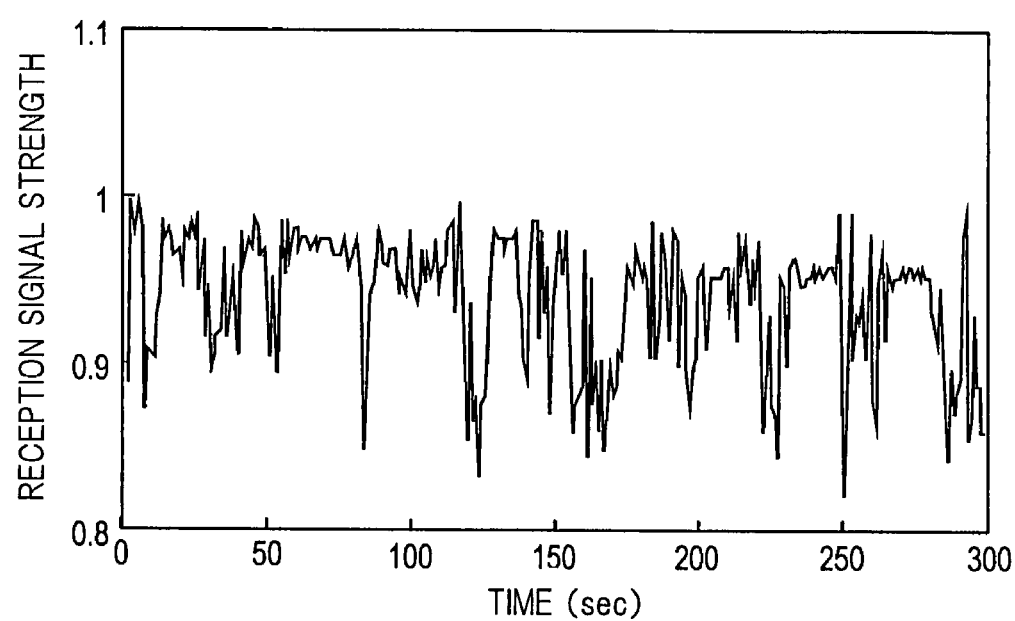
FIG. 33 is a timing chart showing the reception signal strength.

FIG. 31 is a flowchart for use in illustrating detailed operation in step S2B shown in FIG. 30. The flowchart in FIG. 31 includes steps S34 and S35 in place of steps S32 and S33 in the flowchart in FIG. 16, and the other parts is the same as that of the flowchart in FIG. 16.

After step S31 described above, the threshold determining module 242A detects the minimum value D_MIN[i] having a prescribed difference from the threshold PERth for the packet error rate and introduces the detected minimum value D_MIN[i] as the threshold WIth_LL1 (step S34).

Thereafter, the threshold determining module 242A detects the maximum value D_MAX[i] corresponding to the minimum value D_MIN[i] and introduces the detected maximum value D_MAX[i] as the threshold WIth_HH1 (step S35). The series of operations proceeds to step S3A shown in FIG. 30.

In this way, according to the second embodiment, the thresholds WIth_HH1 and WIth_LL1 are determined based on a plurality of pairs of maximum and minimum values {D_MAX [n], D_MIN[n]} and the packet error rate.

Note that according to the second embodiment of the invention, the signal strength measuring module 241 and the threshold determining module 242A form the "threshold determining means."

The table producing module 243A forms the "table producing means."

Furthermore, the threshold determining module 242A that rearranges the n pairs of maximum and minimum values MAX[1] and MIN[1] to MAX[n] and MAX [n] into the n pairs of maximum and minimum values D_MAX[1] and D_MIN[1] to D_MAX[n] and D_MIN[n] or the threshold determining module 242A that rearranges the P pairs of maximum and minimum MAX[1] and MIN[1] to MAX[P] and MIN[P] into the P pairs of maximum and minimum values D_MAX[1] and D_MIN[1] to D_MAX[P] and D_MIN[P] forms the "rearranging means."

Furthermore, the threshold determining module 242A that determines the thresholds WIth_HH and WIth_LL, and WIth_HH1 and WIth_LL1 based on the n pairs of maximum and minimum values D_MAX[1] and D_MIN[1] to D_MAX [n] and D_MIN[n] or the P pairs of maximum and minimum values D_MAX[1] and D_MIN[1] to D_MAX[P] and D_MIN[P] forms the "determining means."

The other parts are the same as that of the first embodiment.

The thresholds With; WIth_HH, WIth_LL; WIth_HH1, and WIth_LL1 are determined based on the maximum and minimum values of the reception signal strengths according to the first and second embodiments described above, but the invention is not limited to the arrangement and the thresholds WIth; WIth_HH, WIth_LL; WIth_HH1, and WIth_LL1 may be determined based on propagation delays.

As described above, according to the invention, the thresholds WIth; WIth_HH, WIth_LL; WIth_HH1, and WIth_LL1 may be determined based on propagation delays, and, in general, the thresholds WIth; WIth_HH, WIth_LL; WIth_HH1, and WIth_LL1 may be determined based on the relation between the maximum and minimum values of a radio wave characteristic that fluctuates at a prescribed width and the number of radio devices.

It is to be understood that the embodiments disclosed herein are illustrative and not restrictive. The scope of the invention is defined by the appended claims rather than by the description preceding them, and all modifications that fall within the scope of claims and equivalence thereof are intended to be embraced by the claims.

INDUSTRIAL APPLICABILITY

The invention is applied to radio devices that allow stable routing to be performed.

The invention claimed is:

1. A radio device for use in an autonomously established radio network by which radio communication is carried out between a source and a destination comprising:
    threshold determining unit for determining a threshold used to detect a radio characteristics equal to or more than the minimum radio characteristic of radio waves transmitted and received in a stable radio wave environment based on a plurality of radio waves received from n radio devices, said n being a positive integer; and
    table producing unit for producing a routing table that indicates routing information between said source and said destination based on the routing information of routes having a radio wave characteristic equal to or more than said determined threshold, wherein:
    said threshold determining unit determines a threshold used to detect a strength equal to or more than the minimum strength of radio waves transmitted and received in said stable radio wave environment, and
    said table producing unit produces said routing table based on the routing information of a route having a strength equal to or more than said determined threshold,
    said threshold determining unit comprises:
    signal strength detecting unit for carrying out signal strength detection processing to detect a first set of m pairs of signal strengths including m maximum reception signal strengths and m minimum reception signal strengths corresponding to said m maximum reception signal strengths based on said plurality of received radio waves, said m being an integer equal to or more than a prescribed number;
    rearranging unit for carrying out rearranging processing to rearrange said detected first set of m pairs of signal strengths so that said m maximum reception signal strengths are in descending or ascending order, thereby producing a second set of m pairs of signal strengths; and
    setting unit for detecting first and second minimum reception signal strengths corresponding to two adjacent first and second maximum reception signal strengths having the largest difference among the m maximum reception signal strengths in said second set of m pairs of signal strengths and setting said threshold in the range defined as having the detected first and second minimum reception signal strengths as end values,
    wherein if packet error is at least a prescribed value, said signal strength detecting unit carries out said signal strength detection processing again to detect a new first set of m pairs of signal strengths, said rearranging unit carries out said rearranging processing based on said new first set of m pairs of signal strengths to produce new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

2. A radio device for use in an autonomously established radio network by which radio communication is carried out between a source and a destination comprising:

threshold determining unit for determining a threshold used to detect a radio characteristics equal to or more than the minimum radio characteristic of radio waves transmitted and received in a stable radio wave environment based on a plurality of radio waves received from n radio devices, said n being a positive integer; and table producing unit for producing a routing table that indicates routing information between said source and said destination based on the routing information of routes having a radio wave characteristic equal to or more than said determined threshold, wherein:

said threshold determining unit determines a threshold used to detect a strength equal to or more than the minimum strength of radio waves transmitted and received in said stable radio wave environment, and said table producing unit produces said routing table based on the routing information of a route having a strength equal to or more than said determined threshold, said threshold determining unit comprises:

signal strength detecting unit for carrying out signal strength detection processing to detect a first set of m pairs of signal strengths including m maximum reception signal strengths and m minimum reception signal strengths corresponding to said m maximum reception signal strengths based on said plurality of received radio waves, said m being an integer equal to or more than a prescribed number;

rearranging unit for carrying out rearranging processing to rearrange said detected first set of m pairs of signal strengths so that said m maximum reception signal strengths are in descending or ascending order, thereby producing a second set of m pairs of signal strengths; and setting unit for detecting first and second minimum reception signal strengths corresponding to two adjacent first and second maximum reception signal strengths having the largest difference among the m maximum reception signal strengths in said second set of m pairs of signal strengths and setting said threshold in the range defined as having the detected first and second minimum reception signal strengths as end values, wherein said prescribed number represents the number of radio devices for which said threshold can stably be determined, if said number n of the radio devices increases to said prescribed number or more, said signal strength detecting unit carries out said signal strength detection processing again to detect a new first set of m pairs of signal strengths, said rearranging unit carries out said rearranging processing based on said new first set of m pairs of signal strengths to produce a new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

3. A radio device for use in an autonomously established radio network by which radio communication is carried out between a source and a destination comprising:

threshold determining unit for determining a threshold used to detect a radio characteristics equal to or more than the minimum radio characteristic of radio waves transmitted and received in a stable radio wave environment based on a plurality of radio waves received from n radio devices, said n being a positive integer; and table producing unit for producing a routing table that indicates routing information between said source and said destination based on the routing information of routes having a radio wave characteristic equal to or more than said determined threshold, wherein:

said threshold determining unit determines a threshold used to detect a strength equal to or more than the minimum strength of radio waves transmitted and received in said stable radio wave environment, and said table producing unit produces said routing table based on the routing information of a route having a strength equal to or more than said determined threshold, said threshold determining unit comprises:

signal strength detecting unit for carrying out signal strength detection processing to detect a first set of m pairs of signal strengths including m maximum reception signal strengths and m minimum reception signal strengths corresponding to said m maximum reception signal strengths based on said plurality of received radio waves, said m being an integer equal to or more than a prescribed number;

rearranging unit for carrying out rearranging processing to rearrange said detected first set of m pairs of signal strengths so that said m maximum reception signal strengths are in descending or ascending order, thereby producing a second set of m pairs of signal strengths; and setting unit for detecting first and second minimum reception signal strengths corresponding to two adjacent first and second maximum reception signal strengths having the largest difference among the m maximum reception signal strengths in said second set of m pairs of signal strengths and setting said threshold in the range defined as having the detected first and second minimum reception signal strengths as end values, wherein if a prescribed number of radio devices are added to said n radio devices, said signal strength detecting unit carries out said signal strength detection processing again based on a plurality of radio waves received from said prescribed number of radio devices and said n radio devices to detect a new first set of m pairs of signal strengths, said rearranging unit carries out said rearranging processing based on said new first set of m pairs of signal strengths to produce a new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

4. A radio device for use in an autonomously established radio network by which radio communication is carried out between a source and a destination comprising:

threshold determining unit for determining a threshold used to detect a radio characteristics equal to or more than the minimum radio characteristic of radio waves transmitted and received in a stable radio wave environment based on a plurality of radio waves received from n radio devices, said n being a positive integer; and table producing unit for producing a routing table that indicates routing information between said source and said destination based on the routing information of routes having a radio wave characteristic equal to or more than said determined threshold, wherein:

said threshold determining unit determines a threshold used to detect a strength equal to or more than the minimum strength of radio waves transmitted and received in said stable radio wave environment, and said table producing unit produces said routing table based on the routing information of a route having a strength equal to or more than said determined threshold, said threshold determining unit comprises:

signal strength detecting unit for carrying out signal strength detection processing to detect a first set of m pairs of signal strengths including m maximum reception signal strengths and m minimum reception signal strengths corresponding to said m maximum reception signal strengths based on said plurality of received radio waves, said m being an integer equal to or more than a prescribed number;

rearranging unit for carrying out rearranging processing to rearrange said detected first set of m pairs of signal strengths so that said m maximum reception signal strengths are in descending or ascending order, thereby producing a second set of m pairs of signal strengths; and setting unit for detecting first and second minimum reception signal strengths corresponding to two adjacent first and second maximum reception signal strengths having the largest difference among the m maximum reception signal strengths in said second set of m pairs of signal strengths and setting said threshold in the range defined as having the detected first and second minimum reception signal strengths as end values, wherein said n equals m, said signal strength detecting unit sequentially receives a plurality of radio waves from each radio device and carries out signal strength detection processing to detect one pair of maximum and minimum reception signal strengths from said received plurality of radio waves for each of said n radio devices, thereby detecting said first set of m pairs of signal strengths.

5. The radio device according to claim 4, wherein if packet error is at least a prescribed value, said signal strength detecting unit carries out said signal strength detection processing again to detect a new first set of m pairs of signal strengths, said rearranging unit carries out said rearranging processing based on said new first set of m pairs of signal strengths to produce new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

6. The radio device according to claim 4, wherein said prescribed number represents the number of radio devices for which said threshold can stably be determined, if said number n of the radio devices increases to said prescribed number or more, said signal strength detecting unit carries out said signal strength detection processing again to detect a new first set of m pairs of signal strengths, said rearranging unit carries out said rearranging processing based on said new first set of m pairs of signal strengths to produce a new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

7. The radio device according to claim 4, wherein if a prescribed number of radio devices are added to said n radio devices, said signal strength detecting unit carries out said signal strength detection processing again based on a plurality of radio waves received from said prescribed number of radio devices and said n radio devices to detect a new first set of m pairs of signal strengths, said rearranging unit carries out said rearranging processing based on said new first set of m pairs of signal strengths to produce a new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

8. A radio device for use in an autonomously established radio network by which radio communication is carried out between a source and a destination comprising:

threshold determining unit for determining a threshold used to detect a radio characteristics equal to or more than the minimum radio characteristic of radio waves transmitted and received in a stable radio wave environment based on a plurality of radio waves received from n radio devices, said n being a positive integer; and table producing unit for producing a routing table that indicates routing information between said source and said destination based on the routing information of routes having a radio wave characteristic equal to or more than said determined threshold, wherein:

said threshold determining unit determines a threshold used to detect a strength equal to or more than the minimum strength of radio waves transmitted and received in said stable radio wave environment, and said table producing unit produces said routing table based on the routing information of a route having a strength equal to or more than said determined threshold, said threshold determining unit comprises:

signal strength detecting unit for carrying out signal strength detection processing to detect a first set of m pairs of signal strengths including m maximum reception signal strengths and m minimum reception signal strengths corresponding to said m maximum reception signal strengths based on said plurality of received radio waves, said m being an integer equal to or more than a prescribed number;

rearranging unit for carrying out rearranging processing to rearrange said detected first set of m pairs of signal strengths so that said m maximum reception signal strengths are in descending or ascending order, thereby producing a second set of m pairs of signal strengths; and setting unit for detecting first and second minimum reception signal strengths corresponding to two adjacent first and second maximum reception signal strengths having the largest difference among the m maximum reception signal strengths in said second set of m pairs of signal strengths and setting said threshold in the range defined as having the detected first and second minimum reception signal strengths as end values, wherein said n is an integer smaller than said prescribed number, and said signal strength detecting unit detects said first set of m pairs of signal strengths based on a plurality of radio waves transmitted from said n radio devices while the radio wave strength for transmission and reception is changed.

9. The radio device according to claim 8, wherein if packet error is at least a prescribed value, said signal strength detecting unit carries out said signal strength detection processing again to detect a new first set of m pairs of signal strengths, said rearranging unit carries out said rearranging processing based on said new first set of m pairs of signal strengths to produce new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

10. The radio device according to claim 8, wherein said prescribed number represents the number of radio devices for which said threshold can stably be determined, if said number n of the radio devices increases to said prescribed number or more, said signal strength detecting unit carries out said signal strength detection processing again to detect a new first set of m pairs of signal strengths, said rearranging unit carries out said rearranging processing based on said new first set of m pairs of signal strengths to produce a new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

11. The radio device according to claim 8, wherein if a prescribed number of radio devices are added to said n radio devices, said signal strength detecting unit carries out said signal strength detection processing again based on a plurality of radio waves received from said prescribed number of radio devices and said n radio devices to detect a new first set of m pairs of signal strengths, said rearranging unit carries out said rearranging processing based on said new first set of m pairs of signal strengths to produce a new second set of m pairs of signal strengths, and said setting unit detects a new pair of first and second minimum reception signal strengths based on said new second set of m pairs of signal strengths and updates said threshold by setting said threshold in the range defined as having the detected new pair of first and second minimum reception signals as end values.

12. A radio device for use in an autonomously established radio network by which radio communication is carried out between a source and a destination comprising:

threshold determining unit for determining a threshold used to detect a radio characteristics equal to or more than the minimum radio characteristic of radio waves transmitted and received in a stable radio wave environment based on a plurality of radio waves received from n radio devices, said n being a positive integer; and table producing unit for producing a routing table that indicates routing information between said source and said destination based on the routing information of routes having a radio wave characteristic equal to or more than said determined threshold, wherein:

said threshold determining unit determines a threshold used to detect a strength equal to or more than the minimum strength of radio waves transmitted and received in said stable radio wave environment, and said table producing unit produces said routing table based on the routing information of a route having a strength equal to or more than said determined threshold, said threshold determining unit comprises:

signal strength detecting unit for carrying out signal strength detection processing to detect a first set of m pairs of signal strengths including m maximum reception signal strengths and m minimum reception signal strengths corresponding to said m maximum reception signal strengths based on said plurality of received radio waves, said m being an integer equal to or more than a prescribed number;

rearranging unit for carrying out rearranging processing to rearrange said detected first set of m pairs of signal strengths so that said m maximum reception signal strengths are in descending or ascending order, thereby producing a second set of m pairs of signal strengths; and setting unit for detecting first and second minimum reception signal strengths corresponding to two adjacent first and second maximum reception signal strengths having the largest difference among the m maximum reception signal strengths in said second set of m pairs of signal strengths and setting said threshold in the range defined as having the detected first and second minimum reception signal strengths as end values, wherein said signal strength detecting unit receives a plurality of packets transmitted from said n radio devices and each including routing information, and detects said first set of m pairs of signal strengths.

13. A radio device for use in an autonomously established radio network by which radio communication is carried out between a source and a destination comprising:

threshold determining unit for determining a threshold used to detect a radio characteristics equal to or more than the minimum radio characteristic of radio waves transmitted and received in a stable radio wave environment based on a plurality of radio waves received from n radio devices, said n being a positive integer; and table producing unit for producing a routing table that indicates routing information between said source and said destination based on the routing information of routes having a radio wave characteristic equal to or more than said determined threshold, wherein:

said threshold determining unit determines a threshold used to detect a strength equal to or more than the minimum strength of radio waves transmitted and received in said stable radio wave environment, and said table producing unit produces said routing table based on the routing information of a route having a strength equal to or more than said determined threshold, said threshold determining unit comprises:

signal strength detecting unit for carrying out signal strength detection processing to detect a first set of m pairs of signal strengths including m maximum reception signal strengths and m minimum reception signal strengths corresponding to said m maximum reception signal strengths based on said plurality of received radio waves, said m being an integer equal to or more than a prescribed number;

rearranging unit for carrying out rearranging processing to rearrange said detected first set of m pairs of signal strengths so that said m maximum reception signal strengths are in descending or ascending order, thereby producing a second set of m pairs of signal strengths; and setting unit for detecting first and second minimum reception signal strengths corresponding to two adjacent first and second maximum reception signal strengths having the largest difference among the m maximum reception signal strengths in said second set of m pairs of signal strengths and setting said threshold in the range defined as having the detected first and second minimum reception signal strengths as end values, wherein said threshold determining unit determines a first threshold used to register a radio device that has transmitted said radio wave as an adjacent radio device in a list of adjacent devices and a second threshold having a prescribed difference from said first threshold and used to remove a radio device that has transmitted said radio wave from said list of adjacent devices so that said first and second thresholds consist of maximum and minimum values of said radio wave characteristic corresponding to each other, and said table producing unit registers a radio device that has transmitted a radio wave having a radio wave characteristic equal to or more than said determined first threshold to said list of adjacent devices to produce said routing table, and removes a radio device that has transmitted a radio wave having a radio wave characteristic lower than said determined second threshold from said list of adjacent devices to update said routing table.

14. The radio device according to claim 13, wherein said radio wave characteristic is the reception strength of said radio wave, and said setting unit detects said two adjacent first and second maximum reception signal strengths determines said first threshold based on said detected first and second maximum reception signal strengths and determines said second threshold based on said detected first and second minimum reception signal strengths.

15. The radio device according to claim 13, wherein said radio wave characteristic is the reception strength of said radio wave, and said setting unit determines a reception signal strength having a prescribed difference from a threshold for packet error as said second threshold and determines a maximum reception signal strength corresponding to the minimum reception signal strength when said second threshold crosses a curve connecting the m minimum reception signal strengths of said second set of m pairs of signal strengths as said first threshold.

* * * * *

UNITED STATES PATENT AND TRADEMARK OFFICE
CERTIFICATE OF CORRECTION

PATENT NO. : 8,121,629 B2
APPLICATION NO. : 11/887188
DATED : February 21, 2012
INVENTOR(S) : Peter Davis et al.

It is certified that error appears in the above-identified patent and that said Letters Patent is hereby corrected as shown below:

On the title page, below the data for Item "(63)" and before Item "(51)", insert the following:

-- (30)   Foreign Application Priority Data

March 31, 2005   (JP)   2005-100356   Japan. --

Signed and Sealed this
Fifth Day of June, 2012

David J. Kappos
*Director of the United States Patent and Trademark Office*